(12) United States Patent
Miyazaki et al.

(10) Patent No.: US 7,826,322 B2
(45) Date of Patent: Nov. 2, 2010

(54) TRACKING ERROR CONTROL APPARATUS, TRACKING ERROR CONTROL CIRCUIT, OPTICAL DISK APPARATUS AND TRACKING ERROR CONTROL METHOD

(75) Inventors: Kazuhiko Miyazaki, Kyoto (JP); Kiyoshi Masaki, Hyogo (JP); Shinichi Yamada, Osaka (JP); Masaya Kuwahara, Osaka (JP); Hideki Shirane, Ehime (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 11/598,716

(22) Filed: Nov. 14, 2006

(65) Prior Publication Data
US 2007/0109922 A1    May 17, 2007

(30) Foreign Application Priority Data
Nov. 15, 2005    (JP)    ............................. 2005-329918

(51) Int. Cl.
*G11B 7/00*    (2006.01)
(52) U.S. Cl. ............... 369/53.28; 369/53.23; 369/30.11
(58) Field of Classification Search ............. 369/30.11, 369/44.28, 30.12, 44.35, 53.23, 53.25, 53.28
See application file for complete search history.

(56) References Cited

U.S. PATENT DOCUMENTS

| | | | |
|---|---|---|---|
| 5,444,682 | A | 8/1995 | Yamada et al. |
| 2002/0051411 | A1 | 5/2002 | Asakura |
| 2003/0133387 | A1 | 7/2003 | Ishida et al. |
| 2004/0105362 | A1 | 6/2004 | Nakano |
| 2005/0207303 | A1* | 9/2005 | Yonezawa ................. 369/53.19 |

FOREIGN PATENT DOCUMENTS

| | | |
|---|---|---|
| JP | 09-147393 | 6/1997 |
| JP | 2002-298394 | 10/2002 |

* cited by examiner

*Primary Examiner*—Brian E Miller
*Assistant Examiner*—Andrew J Sasinowski
(74) *Attorney, Agent, or Firm*—McDermott Will & Emery LLP

(57) ABSTRACT

A second tracking error detector detects the displacement between the track and the light beam and outputs a second displacement detection result based on the comparison of the reproduction signals between first and second pit strings respectively. A second tracking error controller corrects a target position for push-pull control based on the second displacement detection result. A third tracking error controller calculates a correction data of a first displacement detection result based on the correction amount of the target position by the second tracking error controller, and corrects the first displacement detection result based on the calculated correction data.

49 Claims, 29 Drawing Sheets

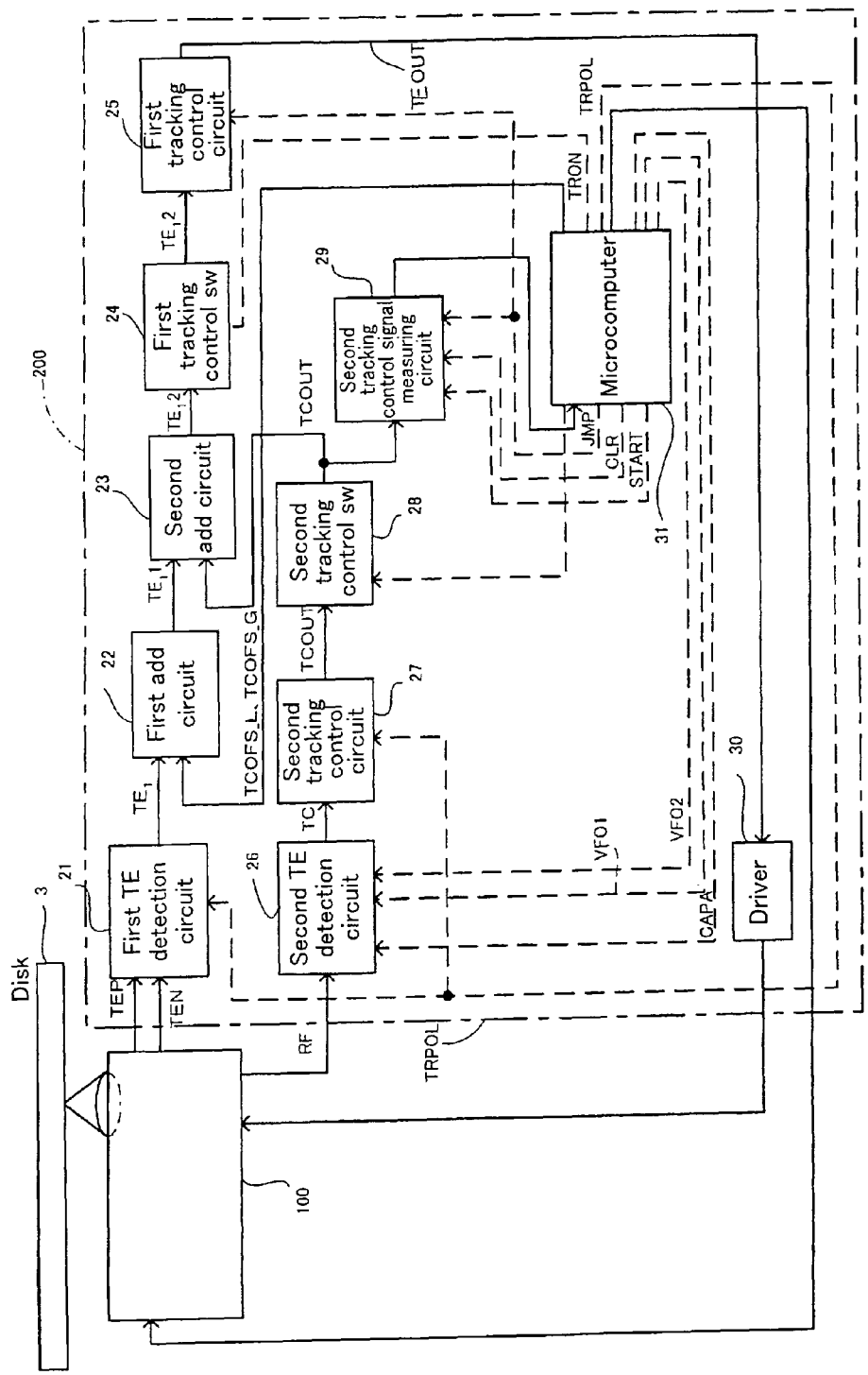
F I G. 1

F I G. 2
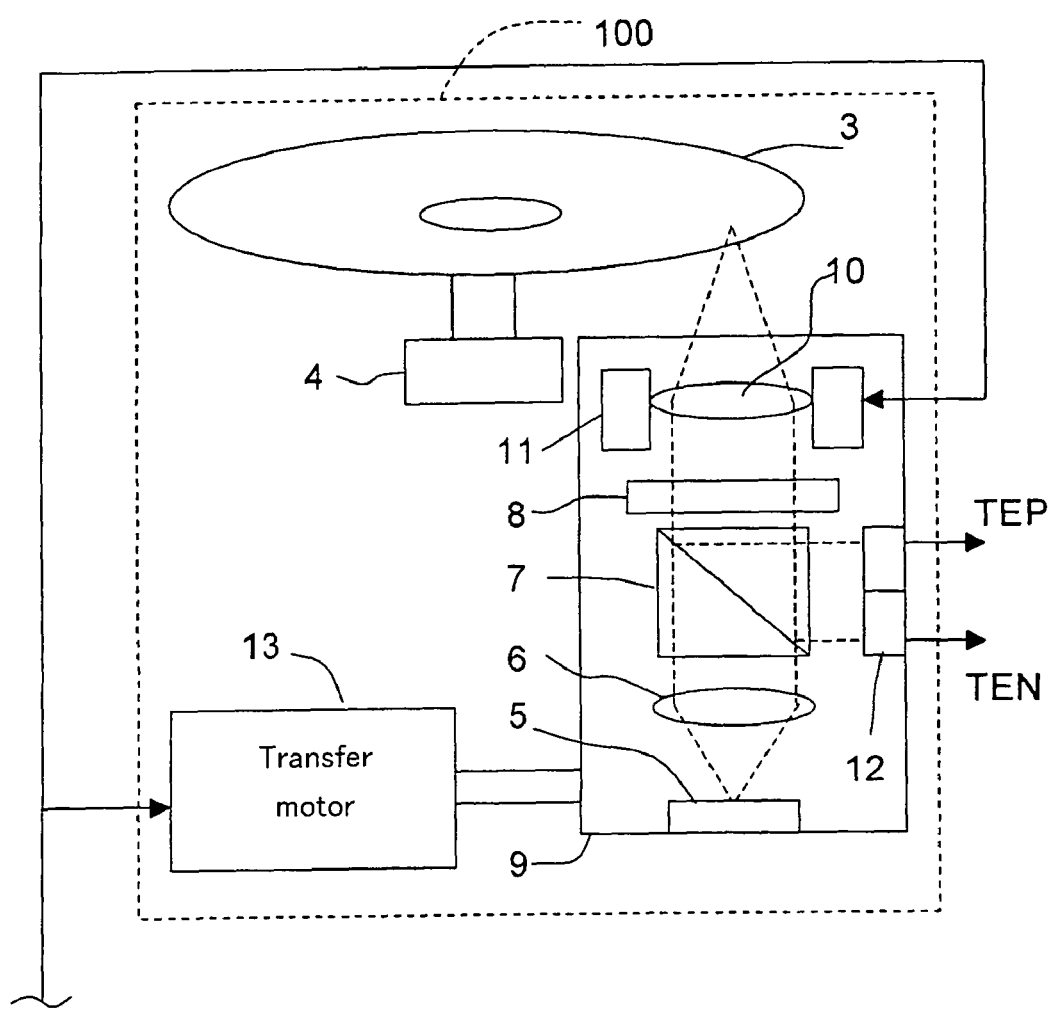

F I G. 1 6
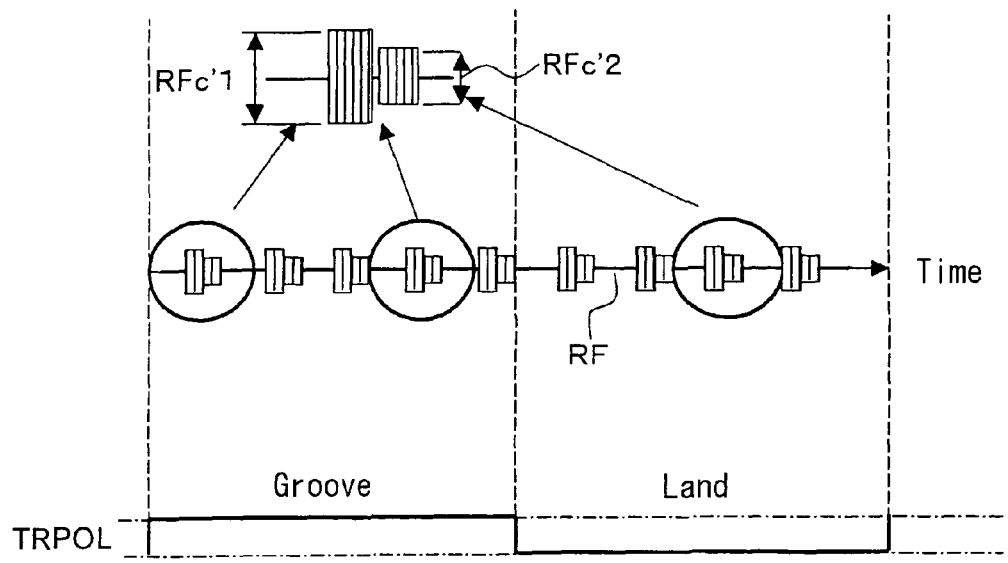
F I G. 1 7
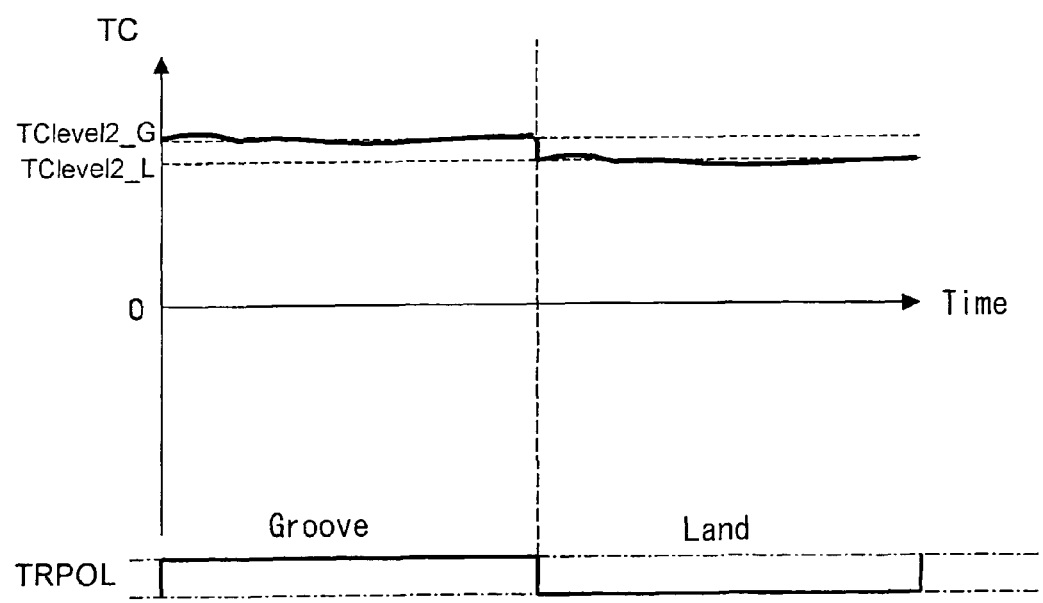

F I G. 2 8
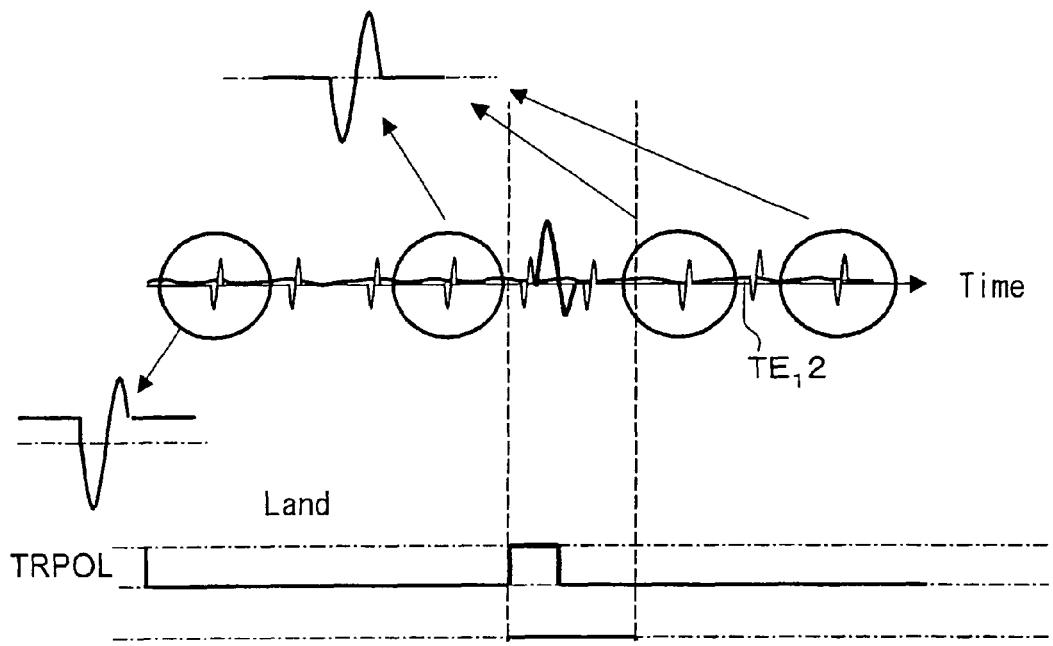
F I G. 2 9
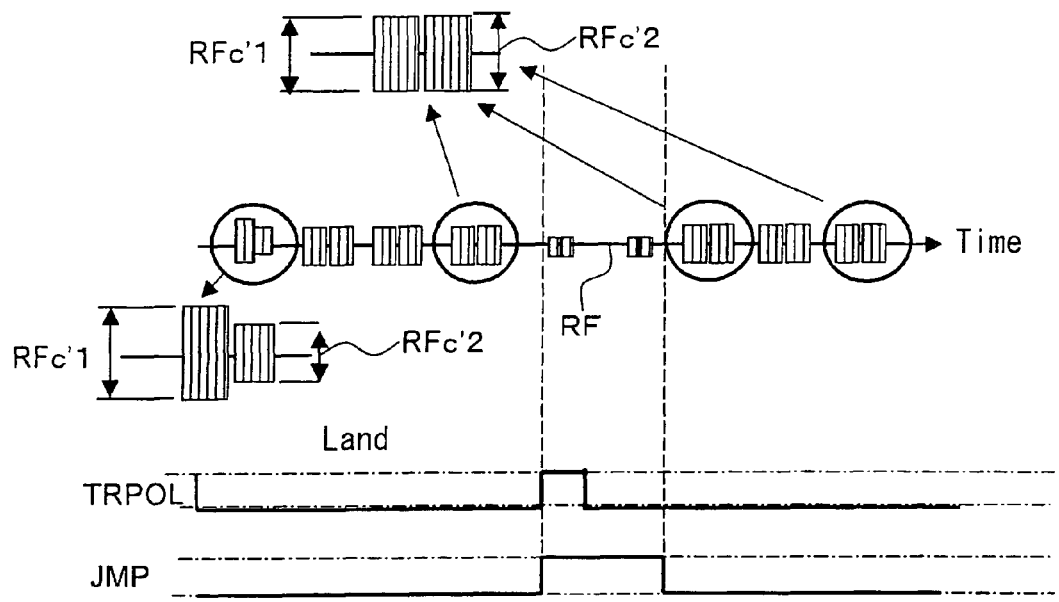

F I G. 3 4
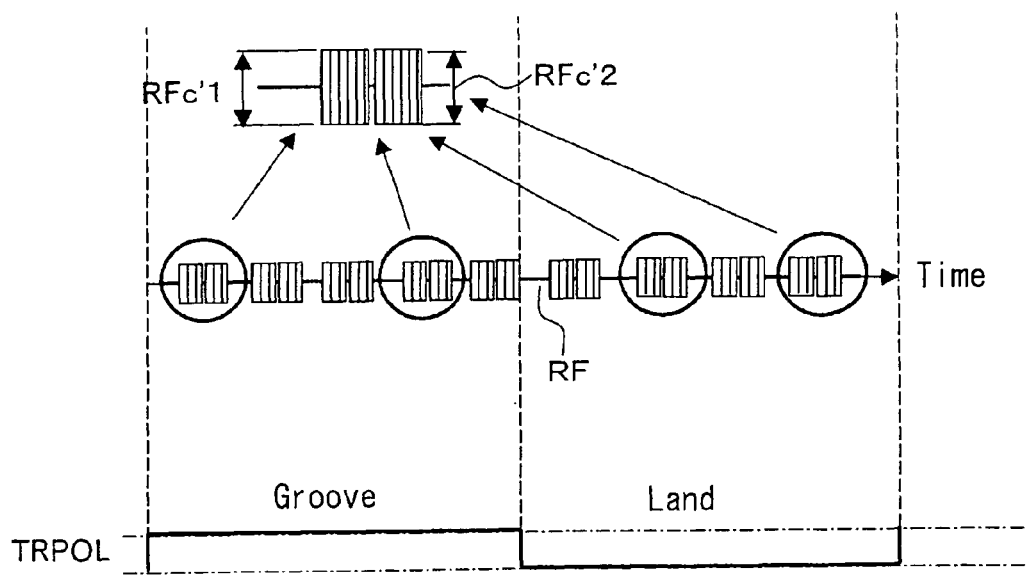
F I G. 3 5
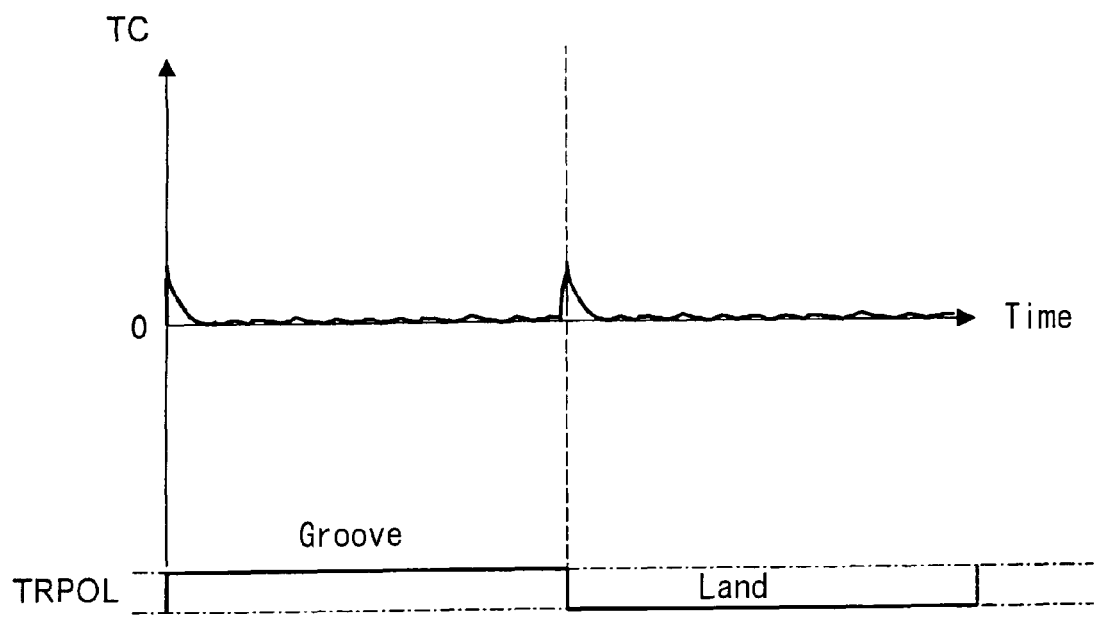

F I G. 3 6
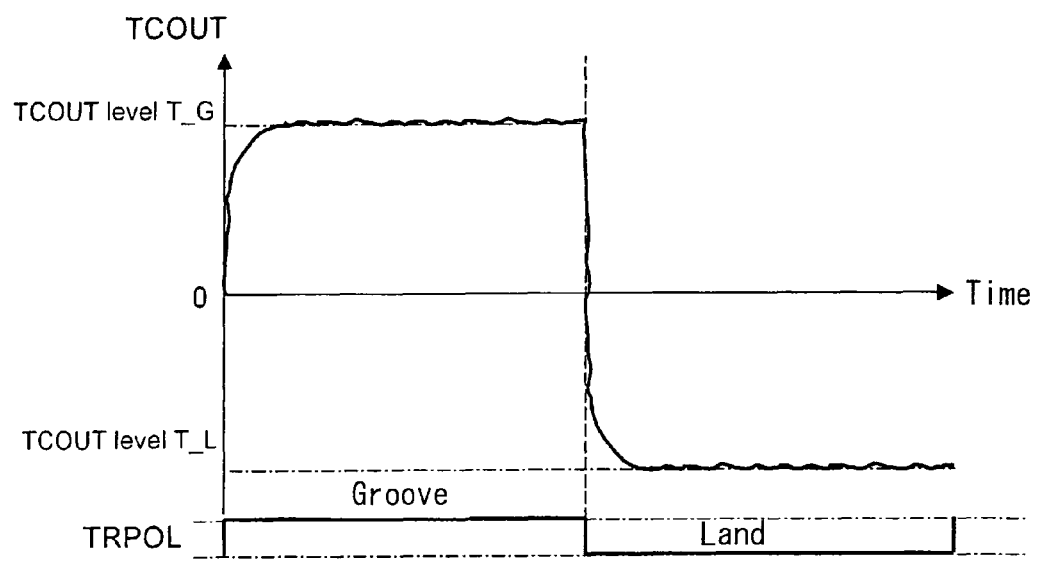
F I G. 3 7
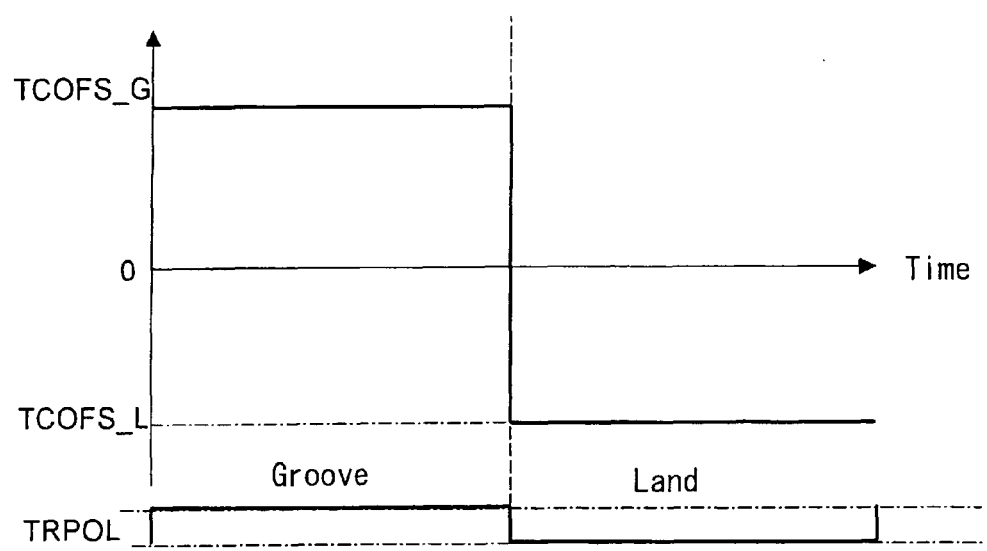

FIG. 38

[Formula 1]

$$TCOFS\_L = AVERAGE[TCOFS\_L(1) + TCOFS\_L(2) + \cdots + TCOFS\_L(nset)]$$
$$TCOFS\_G = AVERAGE[TCOFS\_G(1) + TCOFS\_G(2) + \cdots + TCOFS\_G(nset)]$$

[Formula 2]

$$\sigma(L) = k \times SIGMA[TCOFS\_L(1), TCOFS\_L(2), \ldots, TCOFS\_L(nset)]$$
$$\sigma(G) = k \times SIGMA[TCOFS\_G(1), TCOFS\_G(2), \ldots, TCOFS\_G(nset)]$$
$$TCOFS\_L = AVERAGE\{TCOFS\_L(1) + TCOFS\_L(2) + \cdots + TCOFS\_L(nset)\} \times [1 - \sigma(L)]$$
$$TCOFS\_G = AVERAGE\{TCOFS\_G(1) + TCOFS\_G(2) + \cdots + TCOFS\_G(nset)\} \times [1 - \sigma(G)]$$

TRACKING ERROR CONTROL APPARATUS, TRACKING ERROR CONTROL CIRCUIT, OPTICAL DISK APPARATUS AND TRACKING ERROR CONTROL METHOD

BACKGROUND OF THE INVENTION

1. Field of the Invention

This invention relates to a tracking error control apparatus and method for controlling the tracking error of a light beam in an optical disk apparatus for recording and reproducing the information by the land track/groove track recording method on an optical disk such as the DVD-RAM and the like.

2. Description of the Related Art

Various high-density optical disk formats have been proposed in accordance with the increased demand for a larger capacity in recent years. The land track/groove track format is an example (DVD-RAM disk, etc.) among them. This format includes a convex land track and a concave groove track where polarities of tracking control are inverted alternately with each other in radial direction of the disk. These tracks are spirally formed on the disk, and reproduction is carried out after information is recorded in these tracks.

A header area is formed at the head of each sector of the land and groove tracks. The header area is the area where the address information called CAPA (complementary allocated pit address) is formed. The header area consists of pre-pits so that the address information can be extracted irrespective of whether the read optical head is located on the groove track or the land track. The header area includes a CAPA1 area and a CAPA2 area.

In the optical recording and reproducing apparatus for recording and reproducing information on an optical disk, the focus control operation for keeping the light beam always in a predetermined converged state on a material film and the tracking control operation for controlling the light beam to always scan a predetermined track correctly, are performed. The shift amount of the track for tracking control operation is detected based on the light reflected from the disk like the signal.

Next, the tracking detection method generally called the push-pull method is explained. The signal used for tracking error control operation is hereinafter referred to as the TE signal. The push-pull method is also called the far field method. In this method, the light reflected and diffracted in the guide groove on the disk is received by optical detectors which is split into two parts and arranged symmetrically about the track center, and the output difference between the optical detectors is detected as a TE signal. As long as the center of the light beam spot and the center of the land or groove track coincide with each other, the outputs of the two optical detectors have a symmetric reflection and diffraction distribution. Otherwise, the light strength is varied between the outputs of the two optical detectors. Therefore, in the state where the beam spot is located at the center of the land track or the groove track, the TE signal becomes zero level. As the tracking control operation utilizes this characteristic of the TE signal, the tracking error control operation is performed by moving the beam spot on the disk in the orthogonal direction to the track in accordance with the TE signal. Specifically, the light beam spot (focusing lens) is moved in the direction perpendicular to the track by a tracking actuator in accordance with the TE signal.

In the TE control configuration (control configuration according to the push-pull method) described above, the TE control accuracy is reduced in cases where a radial tilt has been generated in the disk, as described in U.S. Pat. No. 6,459,664, US 2002/0051411, US 2004/0105362, U.S. Pat. No. 5,444,682 and US 2003/0133387. Consequentially, the conventional configuration has been proposed in which a second TE signal is generated based on the light beam reflected when passing through the CAPA1 area and the light beam reflected when passing through the CAPA2 area, and the TE signal described above (hereinafter referred to as the first TE signal) is corrected based on the second TE signal thus generated. Thereby, it is possible to further enhance the control accuracy of a positional shift between the light beam and the track.

In the optical disk having the land track and the groove track, different DC offsets are generated to the first TE signal in the land track and the groove track due to the radial tilt, etc. Therefore, direction of track deviance is opposite in the groove track G and the land track L, there are cases that the relative magnitudes of the amplitude are reversed between the second TE signal obtained from the CAPA1 area and the second TE signal obtained from the CAPA2 area. For this reason, some length of time is required before the second TE signal is stabilized (control is converged) at the track switching point (the timing at which the polarity of the second TE signal is switched).

The frequency band in which the first TE signal can be corrected based on the second TE signal generated in the header area formed discretely on the land track or the groove track, however, is set at a lower level comparing to the tracking control operation in view of the object to be corrected. Due to such reason, in the tracking error control operation for correcting the first TE signal based on the second TE signal, therefore, the time required to stabilize the second TE signal at the track switching point (the timing at which the polarity of the TE signal is switched) is lengthened as compared with the corresponding time for the ordinary tracking error control operation. As a result, the track deviance at the track switching point cannot be instantaneously corrected.

The currently available optical disk apparatus requires a higher recording and reproducing rate, and the aforementioned problem on a correcting rate of the tracking deviance is critical to meet the demand for a higher recording and reproducing rate.

SUMMARY OF THE INVENTION

Accordingly, it is the main object of this invention to hasten the correcting rate of the tracking deviance and meet the requirement for a higher recording and reproducing rate.

In order to achieve the object described above, this invention has a structure as below. A tracking error control apparatus comprises a reproduction signal detector, a scanner, a first tracking error controller, a second tracking error detector, a second tracking error controller and a third tracking error controller, wherein the reproduction signal detector radiates a light beam on an optical disk having a first pit string provided so as to be misaligned on one side in a radial direction of the disk from the center of the track arranged along the peripheral direction of the disk and a second pit string provided so as to be misaligned on the other side in a radial direction of the disk from the track center, and thereby detects the information recorded in the optical disk as a reproduction signal, the scanner scans the light beam along the track, the first tracking error detector detects the displacement between the track and the light beam by the push-pull method and outputs a first displacement detection result, the first tracking error controller sets a target position of the light beam on the track based on the first displacement detection result and controls the scanner in such a manner that the target position is followed by the light beam, the second tracking error detector detects the displacement between the track and the light beam based on the comparison between the reproduction signals of the first and second pit strings and outputs a second displacement detection result, the second tracking error controller corrects the target position of the first tracking error controller based on the second displacement detection result, and the third tracking error controller calculates the correction data of the first displacement detection result based on the correction amount of the target position by the second tracking error controller and corrects the first displacement detection result based on the calculated correction data.

According to this invention, the time required to stabilize the TE signal at the track switching point (the timing at which the polarity of the TE signal is switched) is shortened, thereby it is possible to correct the track displacement quickly at the track switching point. As a result, an optical disk recording and reproducing apparatus can be realized so that it can sufficiently meet the requirement for a higher recording and reproducing rate.

BRIEF DESCRIPTION OF THE DRAWINGS

The above and other objects will become apparent by understanding the following description of embodiments as expressed clearly in the appended claims. The various advantages not described herein will be easily conceived by those skilled in the art by embodying the invention.

FIG. 1 is a diagram showing the configuration of an optical disk apparatus according to a first embodiment of the invention;

FIG. 2 is a diagram showing the configuration of a disk/head block of an optical disk apparatus according to the first embodiment;

FIG. 16 is a waveform diagram showing a first state of an electrical signal RF;

FIG. 17 is a waveform diagram showing a first state of a second TE signal TC;

FIG. 28 is a waveform diagram showing a fifth state of the second TE add signal $TE_1 2$;

FIG. 29 is a waveform diagram showing a third state of the electrical signal RF;

FIG. 34 is a waveform diagram showing a fifth state of the electrical signal RF;

FIG. 35 is a waveform diagram showing a fifth state of the second TE signal TC;

FIG. 36 is a waveform diagram showing a fourth state of the second TE control signal TCOUT;

FIG. 37 is a waveform diagram showing a fourth state of the add data (TCOFS_L, TCOFS_G);

FIG. 38 is a diagram showing the calculation formulae 1 and 2 of the add data (TCOFS_L, TCOFS_G);

DETAILED DESCRIPTION OF THE INVENTION

Hereinafter, an optical disk apparatus to which a tracking error control apparatus is built in and a tracking error control circuit mounted on the tracking error control apparatus according to an embodiment of the invention are explained with reference to the accompanying drawings.

Figure 41:
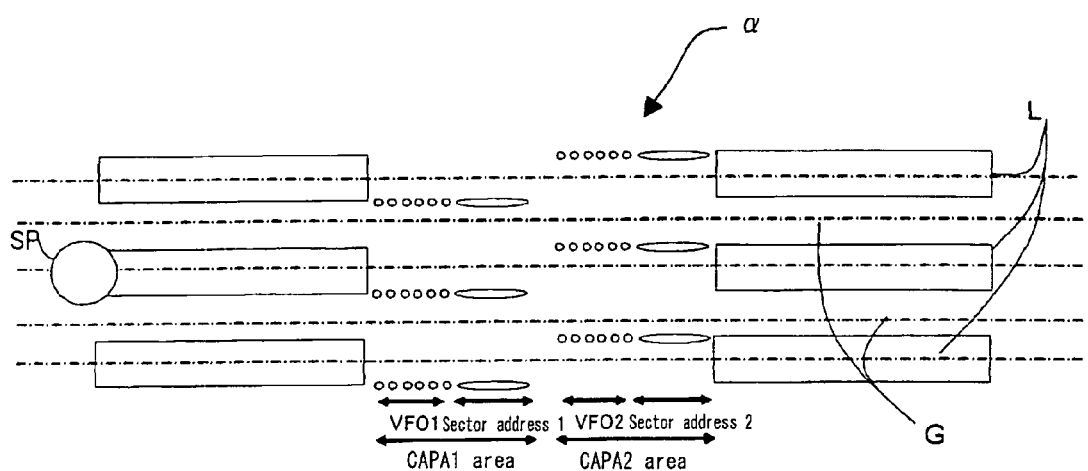
FIG. 41 is a diagram showing the track structure of an optical disk.

Firstly, prior to describing a configuration of the embodiment, the header area "α" of the optical disk is explained. As shown in FIG. 41, the header area "α" is set up at the head of each sector of the land tracks L and the groove tracks G of the optical disk. The header area "α" is an area where the address information called CAPA (complementary allocated pit address) is formed. The header area "α" is configured of pre-pits so that the address information can be extracted regardless of whether the read optical head is located in the groove track or the land track.

The header area "α" includes a CAPA1 area corresponding to a first pit string and a CAPA2 area corresponding to a second pit string. The CAPA1 area is arranged at the head of the groove track G of each sector corresponding thereto, and the CAPA2 area is arranged at the head of the groove track L of each sector corresponding thereto. The CAPA1 area and the CAPA2 area, though arranged between the adjacent land track L and the groove track G at the head of each sector, are not set up at the same radial position but arranged so as to change the radial positions alternately between the land track L and the groove track G.

The CAPA1 and CAPA2 areas are configured of variable frequency oscillators 1, 2 (hereinafter referred to as VFO1, VFO2) and sector addresses 1, 2. The VFO1, VFO2 are recorded with a single frequency and used to form a phase-locked loop (hereinafter referred to as PLL). The sector address 1 set up in the CAPA1 area indicates the address of the sector of the corresponding groove track G, and the sector address 2 set up in the CAPA2 area the address of the sector of the corresponding land track L.

Next, the detection method of a tracking error by the push-pull method is explained. The signal used for tracking error control is hereinafter referred to as the TE signal. The push-pull method is also called the far field method. According to this method, the light reflected and diffracted in a guide groove on the disk is received by the optical detectors split into two parts and arranged symmetrically to the track center and the output difference between the optical detectors is detected as a TE signal.

As long as the center of the light beam spot and the center of the land or groove track coincide with each other, the outputs of the two optical detectors have a symmetric reflection and diffraction distribution. Otherwise, the light strength is varied between the two outputs of the optical detectors. In the case where the beam spot is located at the center of the land track or the groove track, therefore, the TE signal becomes zero level. The tracking control operation utilizes suchlike characteristic of the TE signal, and by moving the spot on the disk in the orthogonal direction to the track in accordance with the TE signal, the tracking error control operation is performed. Specifically, the light beam spot (focusing lens) is moved in the direction perpendicular to the track by a tracking actuator in accordance with the TE signal.

FIRST EMBODIMENT

FIG. 1 shows a configuration of an optical disk apparatus to which the tracking error control apparatus is built in according to the first embodiment of the invention. In this optical disk apparatus, the component elements can be divided into two blocks. Specifically, the optical disk apparatus includes a disk/head block 100 for radiating the light beam on the disk and receiving the light from the disk, and a tracking control block 200. The tracking control block 200 consists of a circuit for carrying out the tracking control operation digitally and a circuit for reading the address. The configuration and operation of each of the blocks 100, 200 is explained below.

(Disk/Head Block 100)

The disk/head block 100, as shown in FIG. 2, includes a disk motor 4 such as a spindle motor for rotating the optical disk 3 which is an information recording medium, an optical head unit 9 for radiating the light beam on the optical disk 3, and a transfer motor 3 constituting an example of a transfer unit for moving the optical head unit 9.

The optical head unit 9 can make up a moving unit for moving the light beam in the radial direction of the optical disk, and the zone where the light beam is located can be determined from the position of the optical head unit 9. The optical head unit 9 includes a light source 5 such as a semi-conductor laser, a coupling lens 6 entered sequentially by the light beam generated from the light source 5, a polarized beam splitter 7, a ¼ wave plate 8, a focusing lens 10, a tracking actuator 11 and a dimidiate light detector entered by the light beam from the optical disk 3. The optical head unit 9 is not necessary to include these component elements as essential ones but it has been shown as an example configuration. According to this embodiment, the tracking actuator 11 and the transfer motor 13 make up a scanner, and a reproduction signal detector consists of the dimidiate light detector 12.

The tracking actuator 11 consists of, for example, a moving part having a tracking coil for tracking and a fixed part having a permanent magnet. The focusing lens 10 is mounted on the moving part of the tracking actuator 11. The dimidiate light detector 12 has a light receiving area divided into two parts wherein the direction of the dividing line corresponds to the tracking direction on the light receiving surface.

The operation of the disk/head block 100 constituted like this is explained below. The optical disk 3 is rotated at a predetermined rotation number (rotational speed) by the disk motor 4. The light beam generated from the light source 5 is converted into parallel light by the coupling lens 6, and passes through the polarized beam splitter 7 and the ¼ wave plate 8 in that order, after which the light is converged on the optical disk 3 by the focusing lens 10 and radiated.

The reflected light of the light beam radiated on the optical disk 3 is passed through the focusing lens 10 and the ¼ wave plate 8 in that order, and after being reflected from the polarized beam splitter 7, the light is radiated on the dimidiate light detector 12. The two light receiving areas of the dimidiate light detector 12 convert the radiated light into electrical signals TEP, TEN, respectively, which are output to the tracking control block 200.

The irradiation position of the light beam to the optical disk 3 is adjusted with the transfer motor 13 and the tracking actuator 11. The transfer motor 13 moves the whole optical head unit 9 in a radial direction of the optical disk 3. The tracking actuator 11 changes the position of the fixed part relative to the permanent magnet through the use of the electromagnetic force generated in accordance with the current flowing in the coil of the moving part so that the light beam is moved in the radial direction of the optical disk, i.e. in the direction across the track.

The transfer motor 13 is used for moving the whole optical head unit 9 in a radial direction of the disk, and the tracking actuator 11 is used to move the light beam of each track. The tracking actuator 11 makes up a moving unit for moving the light beam to a predetermined track by moving the focusing lens 10 as an example of the converging means to converge the light beam. This moving unit is not limited to the tracking actuator 11.

(Tracking Control Block 200)

The tracking control block 200 includes a first TE detection circuit 21, a first add circuit 22, a second add circuit 23, a first tracking control switch 24, a first tracking control circuit 25, a second TE detection circuit 26, a second tracking control circuit 27, a second tracking control switch 28, a second tracking control signal measuring circuit 29, a driver 30 and a microcomputer 31.

Figure 3:
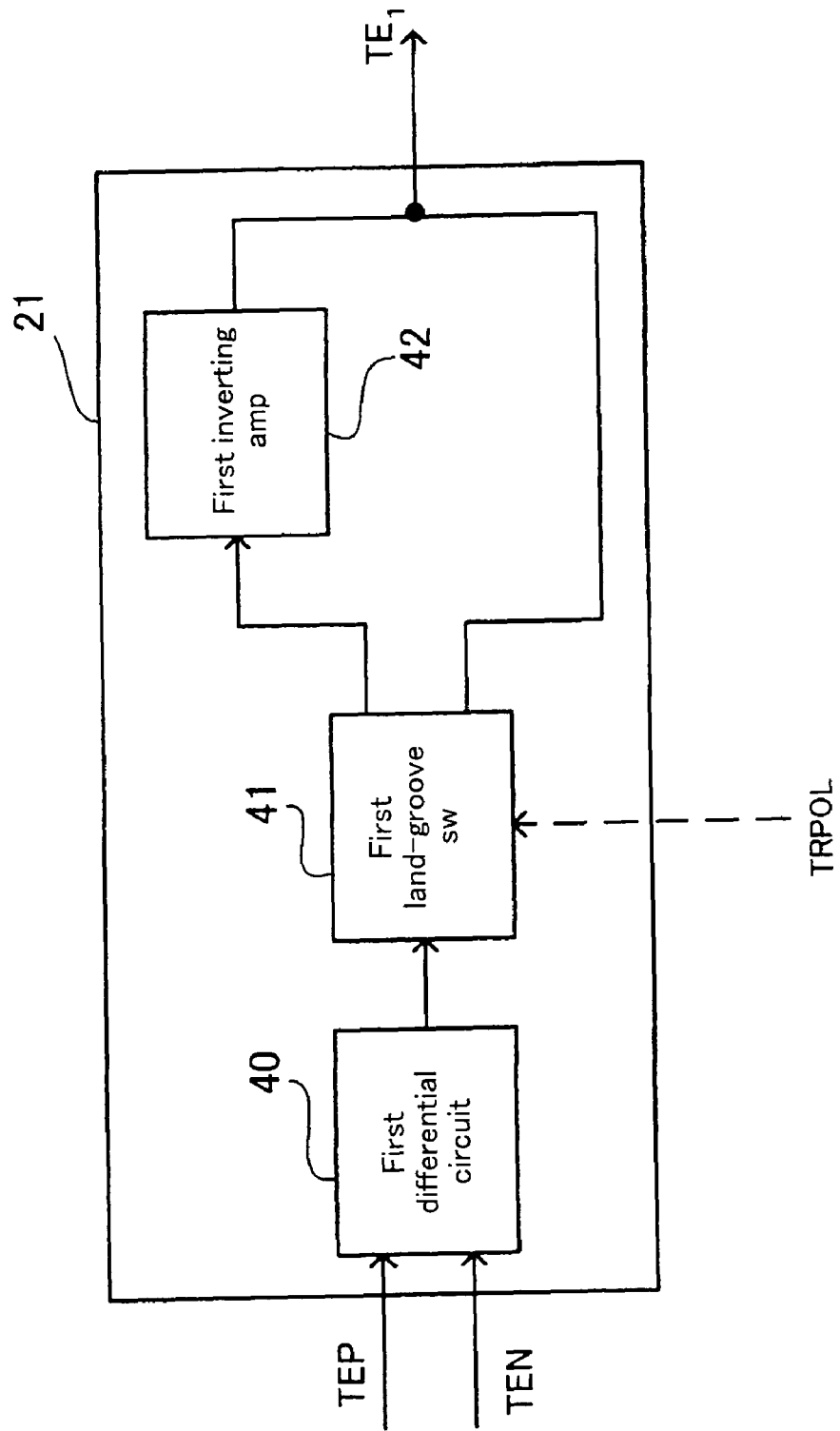
FIG. 3 is a diagram showing the configuration of a first TE detection circuit of the optical disk apparatus according to the first embodiment.

The first TE detection circuit 21 makes up a first tracking error detector, and as shown in FIG. 3, includes a first differential circuit 40, a first land-groove changeover switch 41 and a first reversing amplifier 42. The first differential circuit 40 calculates the difference between the electrical signals TEP and TEN outputted from the dimidiate light detector 12, and outputs the difference to the first land-groove changeover switch 41. The first land-groove changeover switch 41 switches and outputs the output of the first differential circuit 40 based on the TRPOL signal supplied from the microcomputer 31.

The TRPOL signal is a signal for discriminating the outputs from the land track and the groove track, and generated in the microcomputer 31. The first land-groove changeover switch 41 performs switching of the next output based on the TRPOL signal. In other words, the first land-groove changeover switch 41 outputs the output (difference) of the first differential circuit 40 corresponding to the groove track G to the first reversing amplifier 42, and outputs the output (difference) of the first differential circuit 40 corresponding to the land track L directly to the first add circuit 22 as a first TE signal $TE_1$ without going through the first reversing amplifier 42 on the other hand.

The first reversing amplifier 42 inverts the output of the first differential circuit 40 (the difference corresponding to the groove track G) supplied through the first land-groove change-over switch 41, and outputs the resultant signal as a first TE signal $TE_1$ to the first add circuit 22. The first TE signal $TE_1$ corresponds to the first displacement detection result.

Figure 4:
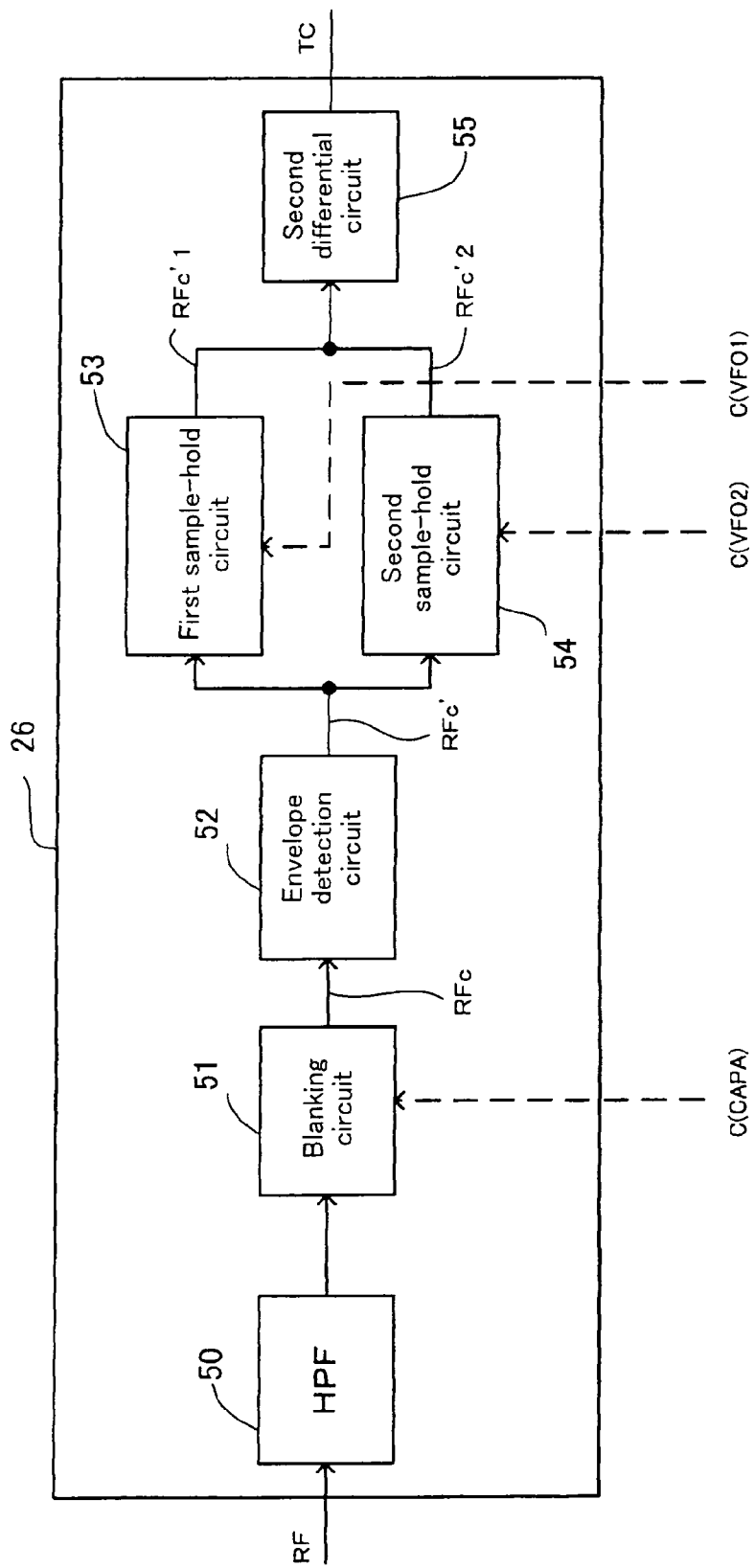
FIG. 4 is a diagram showing the configuration of a second TE detection circuit of the optical disk apparatus according to the first embodiment.

The second TE detection circuit 26 makes up a second tracking error detector, and as shown in FIG. 4, includes a high-pass filter (hereinafter referred to as the HPF) 50, a blanking circuit 51, an envelope detection circuit 52, a first sample-hold circuit 53, a second sample-hold circuit 54 and a second differential circuit 55.

The HPF 50 removes the DC component from the electrical signal RF supplied from the dimidiate light detector 12 and outputs the resulting signal to the blanking circuit 51. The electrical signal RF, for example, represents the sum of the two outputs of the dimidiate light detector 12 (electrical signals TEP, TEN).

The blanking circuit 51, based on the CAPA detection signal C (CAPA) supplied from the microcomputer 31, extracts the signal area RFc corresponding to the header area "α" (refer to FIG. 41) in the electrical signal RF and outputs it to the envelope detection circuit 52. The CAPA detection signal C (CAPA) is for discriminating the header area "α" (refer to FIG. 41) in the RF signal and generated in the microcomputer 31.

The envelope detection circuit 52 detects the amplitude RFc' of the signal area RFc and outputs it to the first and second sample-hold circuits 53, 54. The first sample-hold circuit 53, based on the VFO1 detection signal C (VF01) supplied from the microcomputer 31, extracts the amplitude RFc'1 of the signal area corresponding to VFO1 from the amplitude RFc' and outputs it to the second differential circuit 55. The VFO1 detection signal C (VF01) is a signal for discriminating the signal area corresponding to the VF01 in the electrical signal RF and generated in the microcomputer 31.

The second sample-hold circuit 54, based on the VFO2 detection signal C (VF02) supplied from the microcomputer 31, extracts the amplitude RFc'2 of the signal area corresponding to the VFO2 detection signal C (VF02) from the amplitude RFc' and outputs it to the second differential circuit 55. Here, the VFO2 detection signal C (VF02) is a signal for discriminating the VF02 (FIG. 41) in the RF signal and generated in the microcomputer 31.

The second differential circuit 55 generates the difference between the amplitude RFc'1 and the amplitude RFc'2, and outputs the difference as a second TE signal TC to the second tracking control circuit 27. The second TE signal TC corresponds to the second displacement detection result.

Figure 5:
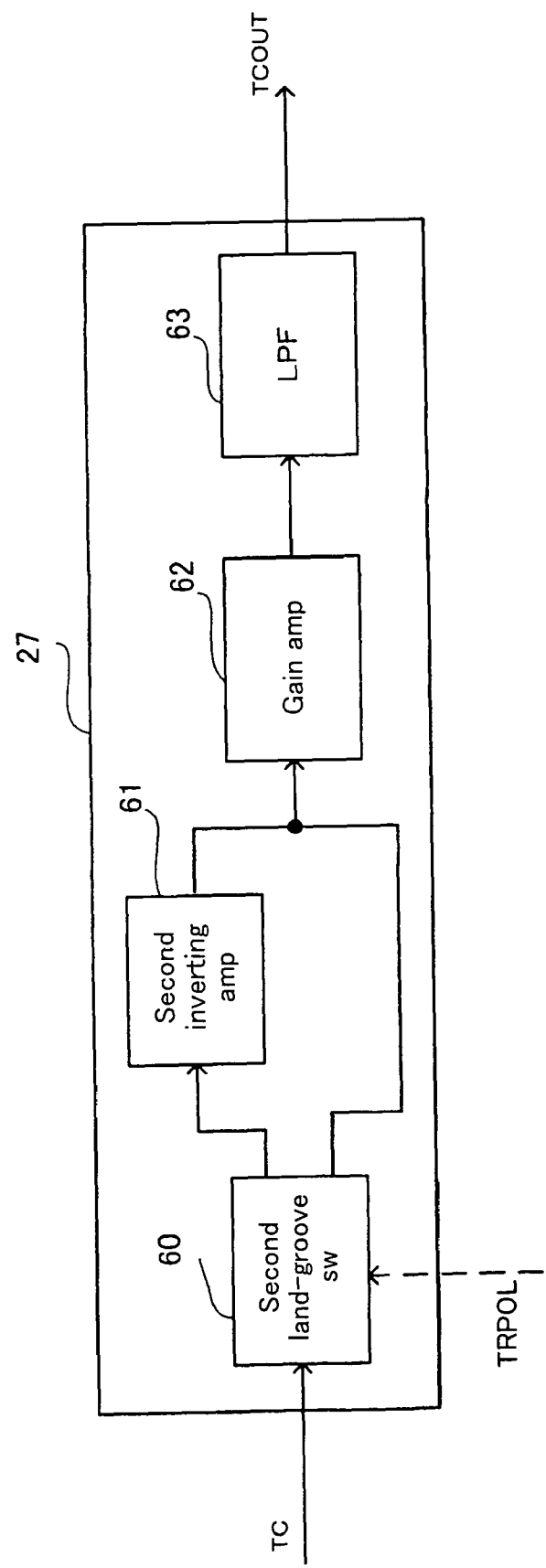
FIG. 5 is a diagram showing the configuration of a second tracking control circuit of the optical disk apparatus according to the first embodiment.

The second tracking control circuit 27, as shown in FIG. 5, includes a second land-groove changeover switch 60, a second reversing amplifier 61, a gain amplifier 62 and a low-pass filter (hereinafter referred to as the LPF) 63. The second land-groove changeover switch 60, based on the TRPOL signal supplied from the microcomputer 31, switches and outputs the second TE signal TC. Here, the TRPOL signal is the same signal as the one explained in the first TE detection circuit 21. The second land-groove changeover switch 60 switches the next output based on the TRPOL signal. That is, the second land-groove changeover switch 60 outputs the signal area of the second TE signal TC corresponding to the land track L to the second reversing amplifier 61 and outputs the signal area of the second TE signal TC corresponding to the groove track G directly to the gain amplifier 62 without going through the second reversing amplifier 61 on the other hand. The second reversing amplifier 61 inverts the signal area of the second TE signal TC corresponding to the groove track G supplied through the second land-groove changeover switch 60 and outputs the inverted signal to the gain amplifier 62. The gain amplifier 62 adjusts the gain of the second TE signal TC supplied from the second land-groove changeover switch 60 or the second reversing amplifier 61 and outputs the resulting signal to the LPF 63. The LPF 63, after removing the high-frequency component of the output of the gain amplifier 62 (the second TE signal TC adjusted in gain), outputs the resultant signal to the second tracking control switch 28 as a second TE control signal TCOUT. The second TE control signal TCOUT corresponds to the correction amount of the target position on the track of the light beam.

The second tracking control switch 28 performs the control operation to determine, based on the command from the microcomputer 31, whether the second TE control signal TCOUT supplied from the second tracking control circuit 27 is outputted or not to the second add circuit 23 and the second tracking control signal measuring circuit 29.

The second tracking control signal measuring circuit 29 measures the level of the second TE control signal TCOUT outputted from the second tracking control switch 28 and outputs the measurement result to the microcomputer 31.

The microcomputer 31, based on the result of level measurement of the second TE control signal TCOUT supplied from the second tracking control signal measuring circuit 29, calculates and stores the add data (TCOFS_L, TCOFS_G), and further outputs the stored add data (TCOFS_L, TCOFS_G) to the first add circuit 22 at a predetermined timing. The add data (TCOFS_L) is the add data corresponding to the land track, while the add data (TCOFS_G) is the add data corresponding to the groove track. The add data (TCOFS_L, TCOFS_G) correspond to the correction data of the first displacement detection result.

The first add circuit 22 add the add data (TCOFS_L, TCOFS_G) supplied from the microcomputer 31 to the output of the first TE detection circuit 21 (first TE signal $TE_1$) so as to generate a first TE add signal $TE_1$1, and outputs the first TE add signal $TE_1$1 signal thus generated to the second add circuit 23.

The second add circuit 23 add the second TE control signal TCOUT supplied through the second tracking control switch 28 to the first TE add signal $TE_1 1$ supplied from the first add circuit 22 so that the second TE add signal $TE_1 2$ is generated, and output it to the first tracking control switch 24.

The first tracking control switch 24 performs the control operation to determine, based on the command from the microcomputer 31, whether the second TE add signal $TE_1 2$ supplied from the second add circuit 23 is outputted to the first tracking control circuit 25 or not.

The first tracking control circuit 25 making up the first tracking error controller, based on the second TE add signal $TE_1 2$ supplied from the second add circuit 23 through the first tracking control switch 24, generates the first TE control signal TEOUT and outputs it to the driver 30. The first TE control signal TEOUT corresponds to the target position on the track of the light beam.

The driver 30, based on the first TE control signal TEOUT, drives and controls the tracking actuator 11 thereby to perform the TE control operation of the optical head unit 9 (position control of the focusing lens 10). The first tracking control circuit 25 specifically consists of a digital filter for phase compensation.

According to this embodiment, a second tracking error controller consists of the second tracking control circuit 27 and the second add circuit 23, while a third tracking error controller consists of the second tracking control signal measuring circuit 29, the microcomputer 31 and the first add circuit 22.

Figure 6:
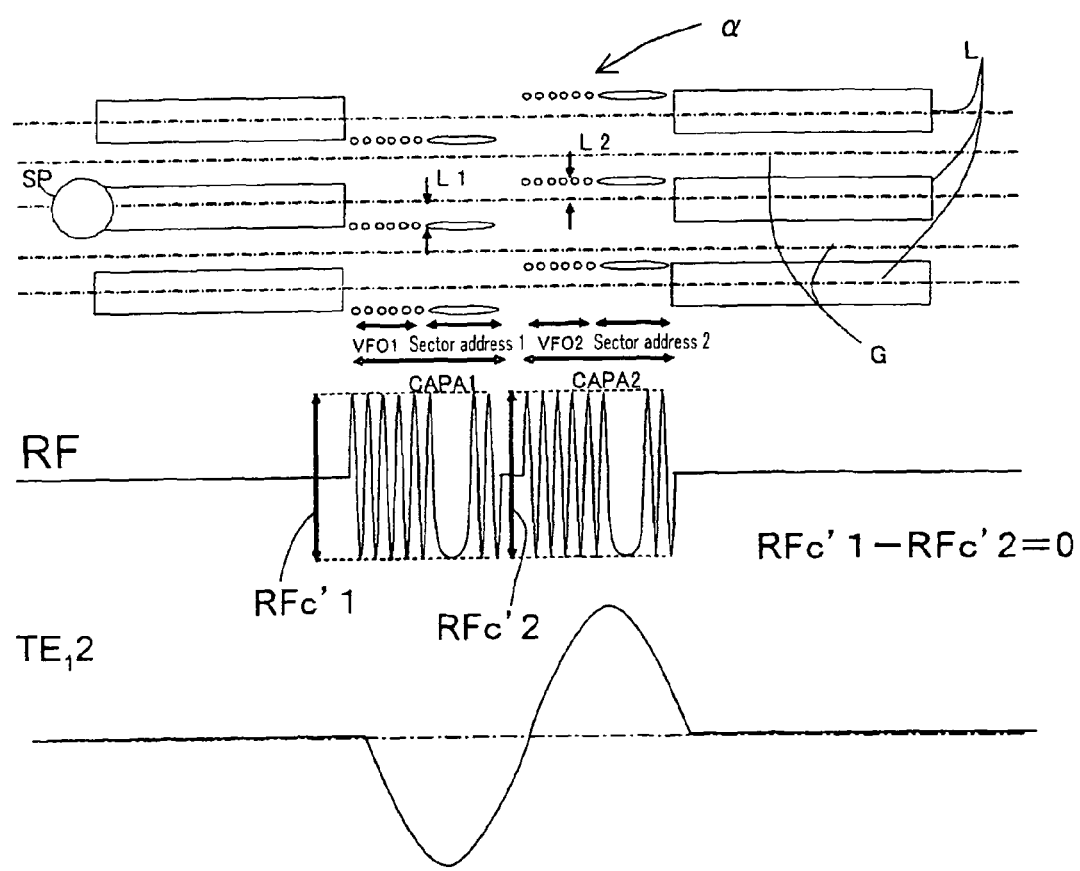
FIG. 6 is a first waveform diagram showing the relation between the position of the light beam and the amplitude of an electrical signal RF.

Next, the variation appearance of the signal waveform in the electrical signal RF and the second TE add signal $TE_1 2$ is explained with reference to FIGS. 6 to 9. To simplify the explanation in FIGS. 6 to 9, assume that the recording marks are not formed in regard to the land track L and the groove track G except for the header area "α", i.e. it is in an unrecorded state. This signal waveform variation is caused by the position consistency between the spot "sp" of the light beam of the focusing lens 10 and the tracks L, G. As long as the spot "sp" is located at the track center of the tracks L, G, as shown in FIG. 6, the amplitude RFc'1 in the VFO1 of the electrical signal RF and the amplitude RFc'2 in the VFO2 are substantially equal to each other (RFc'1=RFc'2). Suchlike amplitude difference also occurs in the second TE add signal $TE_1 2$.

Figure 7:
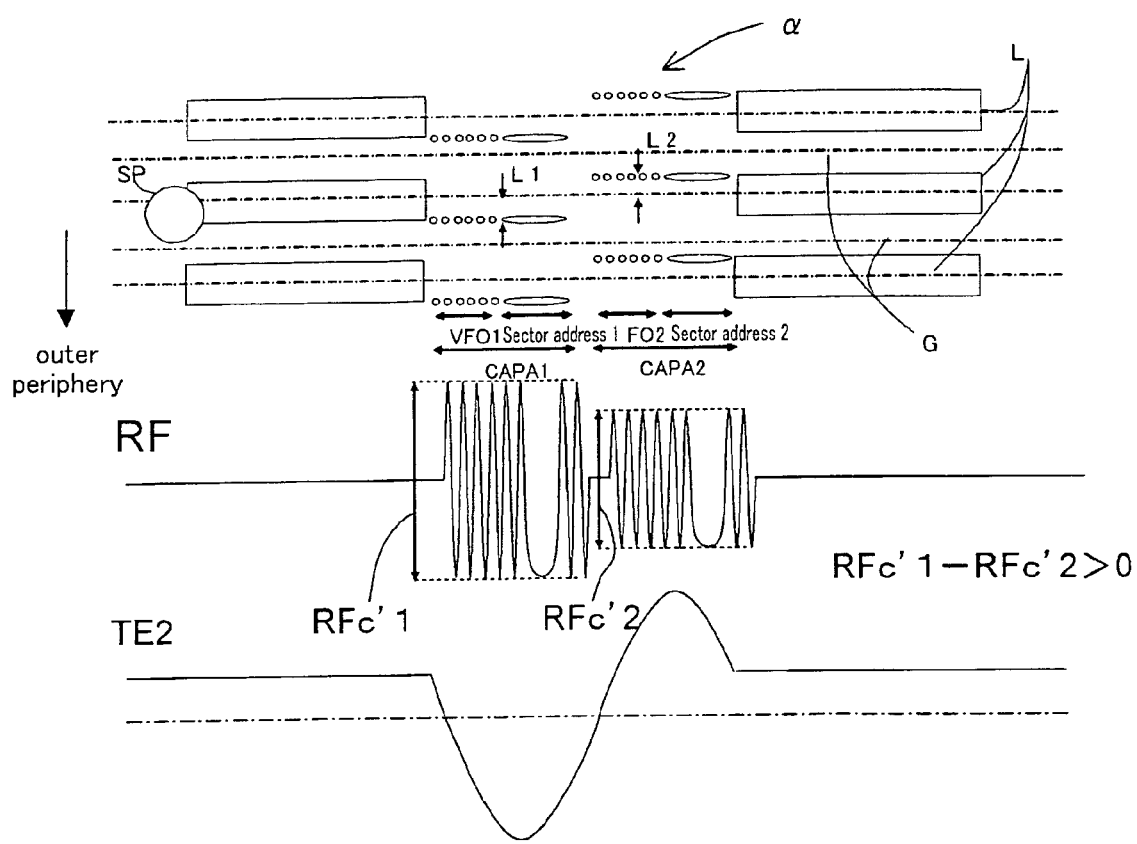
FIG. 7 is a second waveform diagram showing the relation between the position of the light beam and the amplitude of the electrical signal RF.

In the case where the spot "sp" is displaced from the track center of the tracks L, G toward the outer periphery of the disk, as shown in FIG. 7, the amplitude RFc'1 in the VFO1 of the electrical signal RF is larger than the amplitude RFc'2 in the VFO2 (RFc'1−RFc'2>0). A similar amplitude difference occurs also in the second TE add signal $TE_1 2$.

Figure 8:
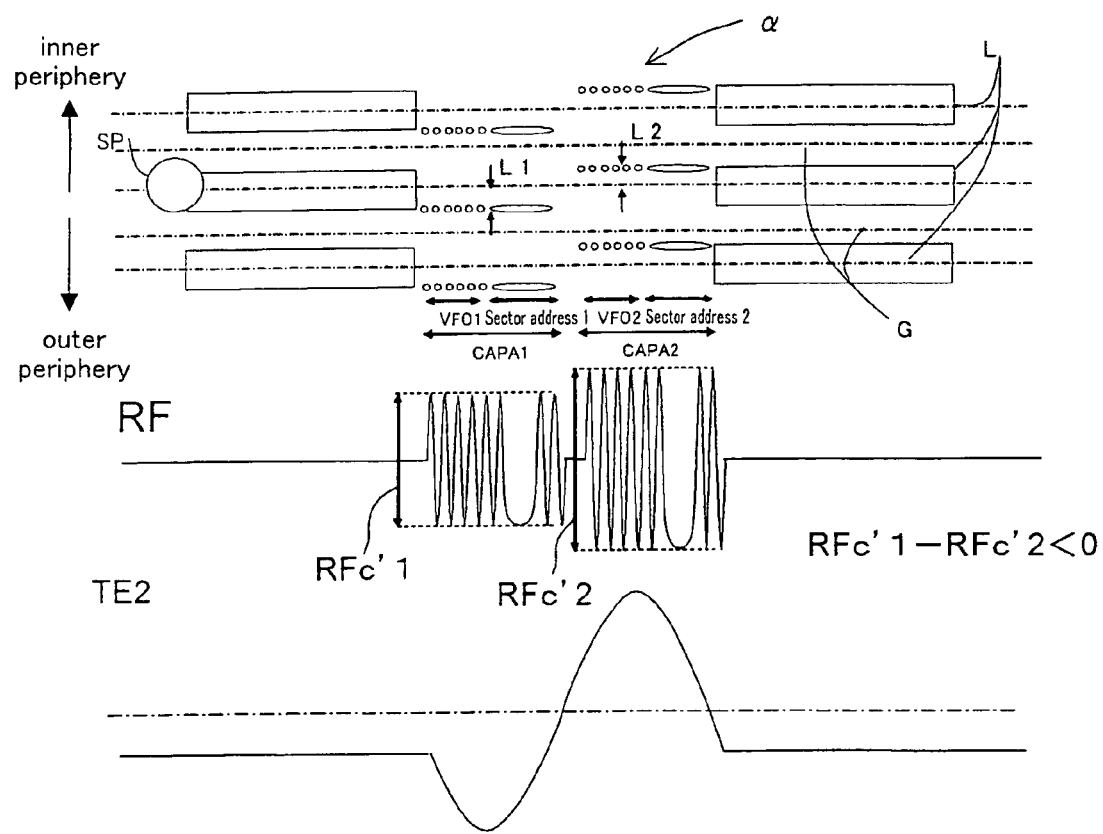
FIG. 8 is a third waveform diagram showing the relation between the position of the light beam and the amplitude of the electrical signal RF.

In the case where the spot "sp" is displaced from the track center of the tracks L, G toward the inner periphery of the disk, as shown in FIG. 8, the amplitude RFc'1 in the VFO1 of the electrical signal RF is smaller than the amplitude RFc'2 in the VFO2 (RFc'1−RFc'2 <0). A similar amplitude difference occurs in the second TE add signal $TE_1 2$.

Figure 9:
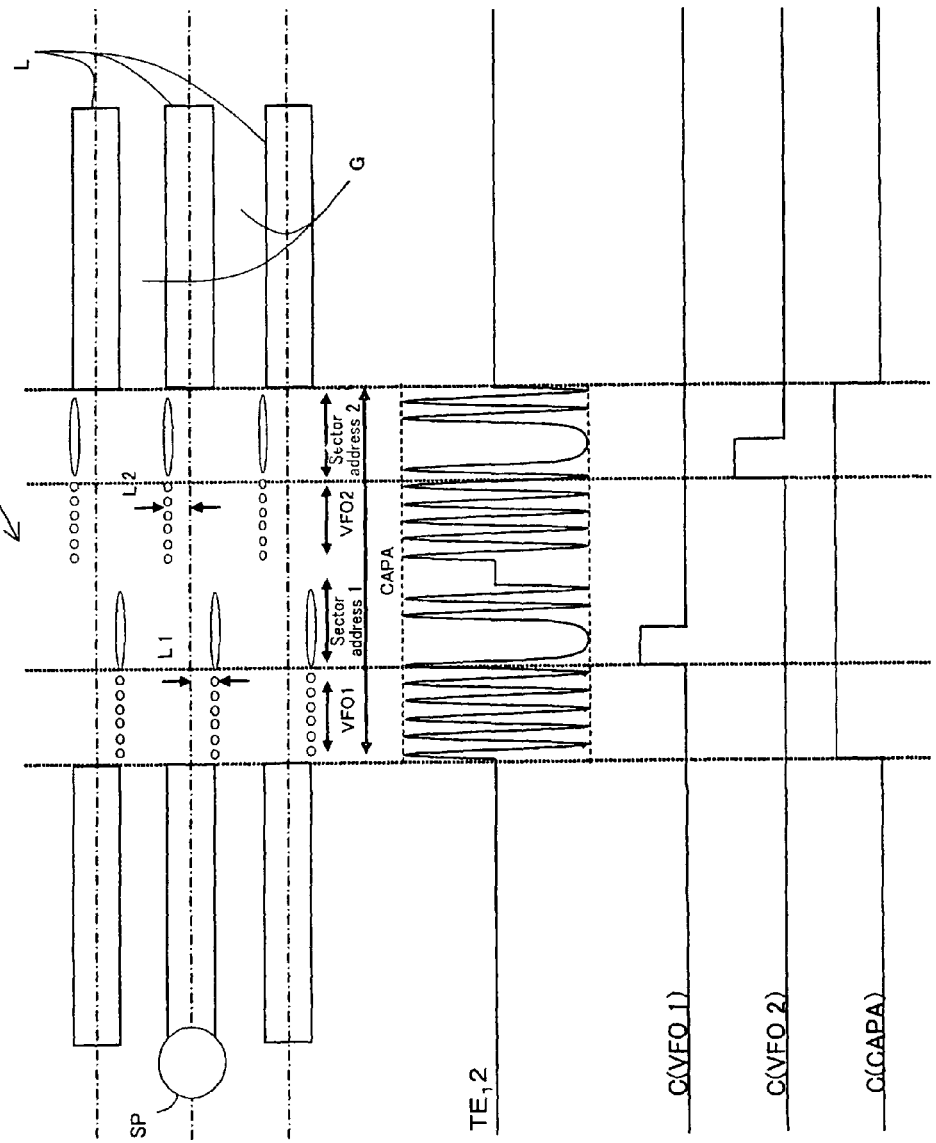
FIG. 9 is a first waveform diagram showing the relation between the light beam and a second TE add signal.

Next, the detailed operation of the second TE detection circuit 26 is explained with reference to the waveform diagrams of FIGS. 9 to 12. To simplify the explanation, assume that the recording marks are not formed in relation to the land track L and the groove track G except for the header area "α", i.e. it is in an unrecorded state. As shown in FIG. 9, the microcomputer 31 outputs the CAPA detection signal C (CAPA) which becomes "H" in the section where the spot "sp" passes the header area "α", to the blanking circuit 51. During the period when the CAPA detection signal C (CAPA) supplied thereto is "H", the blanking circuit 51 extracts the CAPA and outputs the extraction result RFc to the envelope detection circuit 52. The envelope detection circuit 52 calculates the amplitude RFc' of the CAPA extraction result RFc supplied thereto, and outputs the calculation result (amplitude RFc') to the first sample-hold circuit 53 and the second sample-hold circuit 54.

The microcomputer 31, as shown in FIG. 9, generates the VFO1 detection signal C (VFO1) which rises at the timing immediately after output of the VFO1 is completed and outputs it to the first sample-hold circuit 53, and generates the VFO2 detection signal C (VFO2) which rises at the timing immediately after output of the VFO2 is completed and outputs it to the second sample-hold circuit 54 on the other hand.

The first sample-hold circuit 53 extracts the amplitude RFc' at the time when the supplied VFO1 detection signal C (VF01) rises, and consequently extracts the amplitude RFc'1 of the VFO1.

The second sample-hold circuit 54 extracts the amplitude RFc' at the time point of rise of the supplied VFO2 detection signal C (VF02), and consequently extracts the amplitude RFc'2 of the VFO2.

Figure 10:
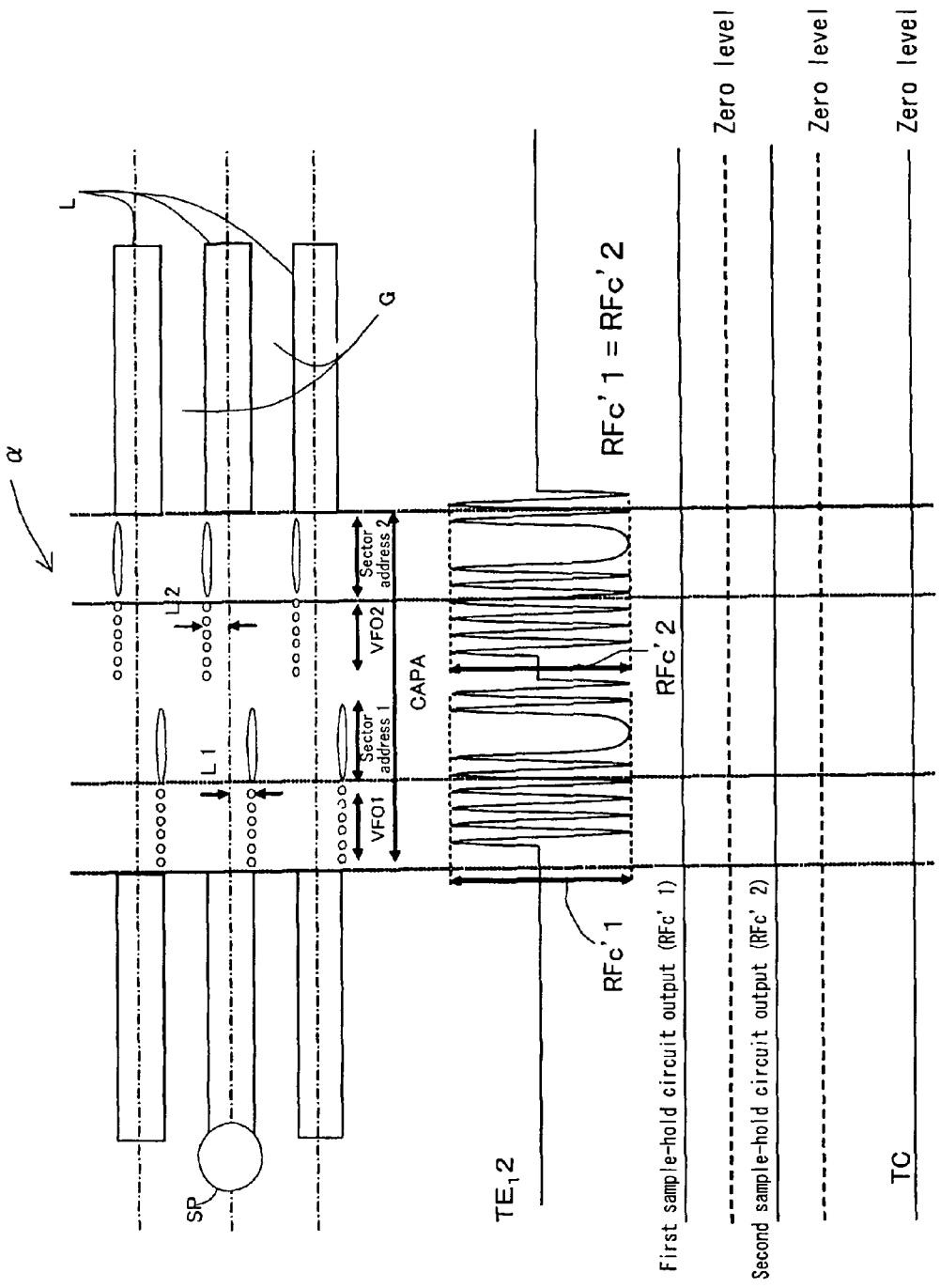
FIG. 10 is a second waveform diagram showing the relation between the light beam and the second TE add signal.
Figure 11:
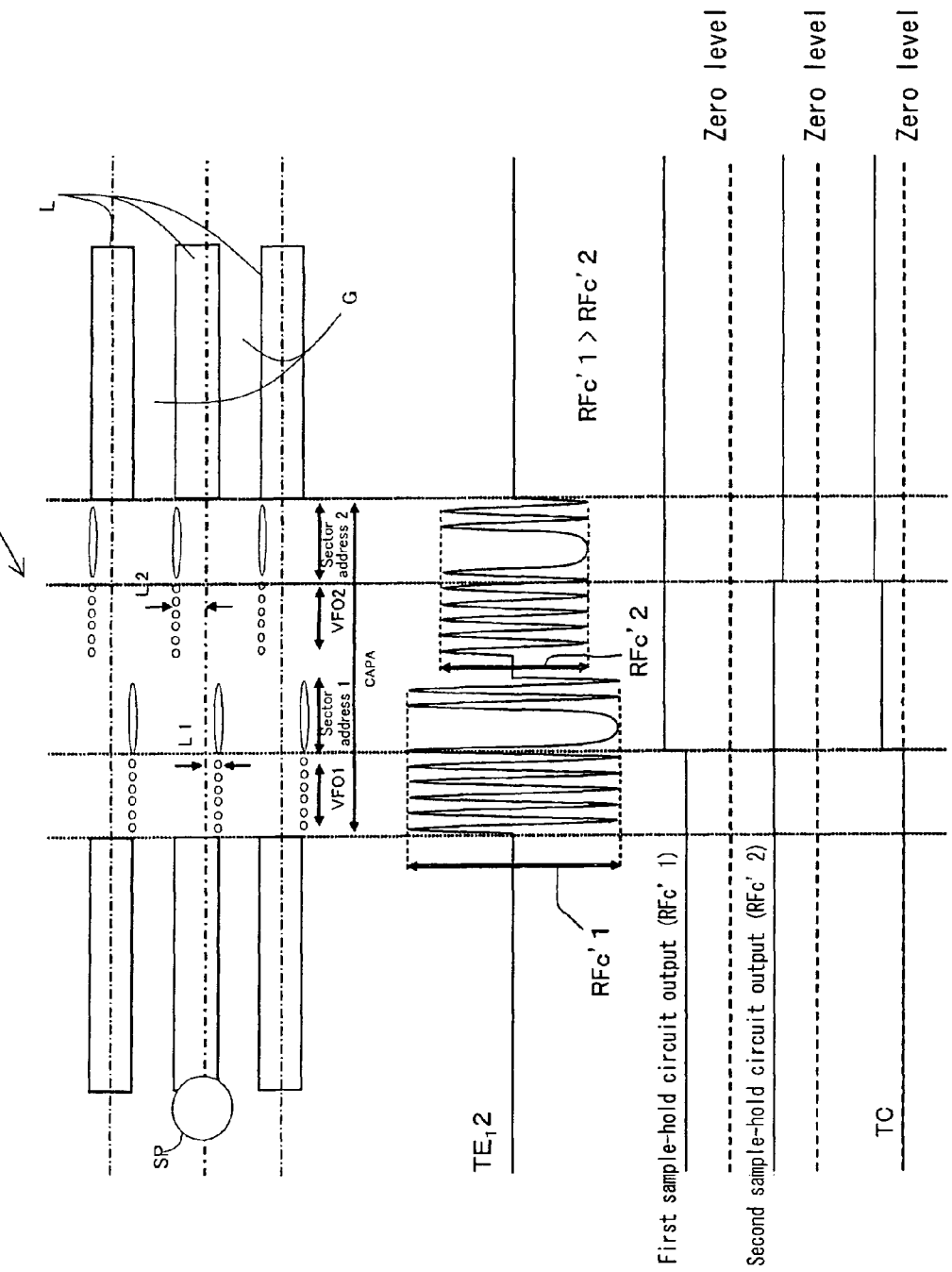
FIG. 11 is a third waveform diagram showing the relation between the light beam and the second TE add signal.
Figure 12:
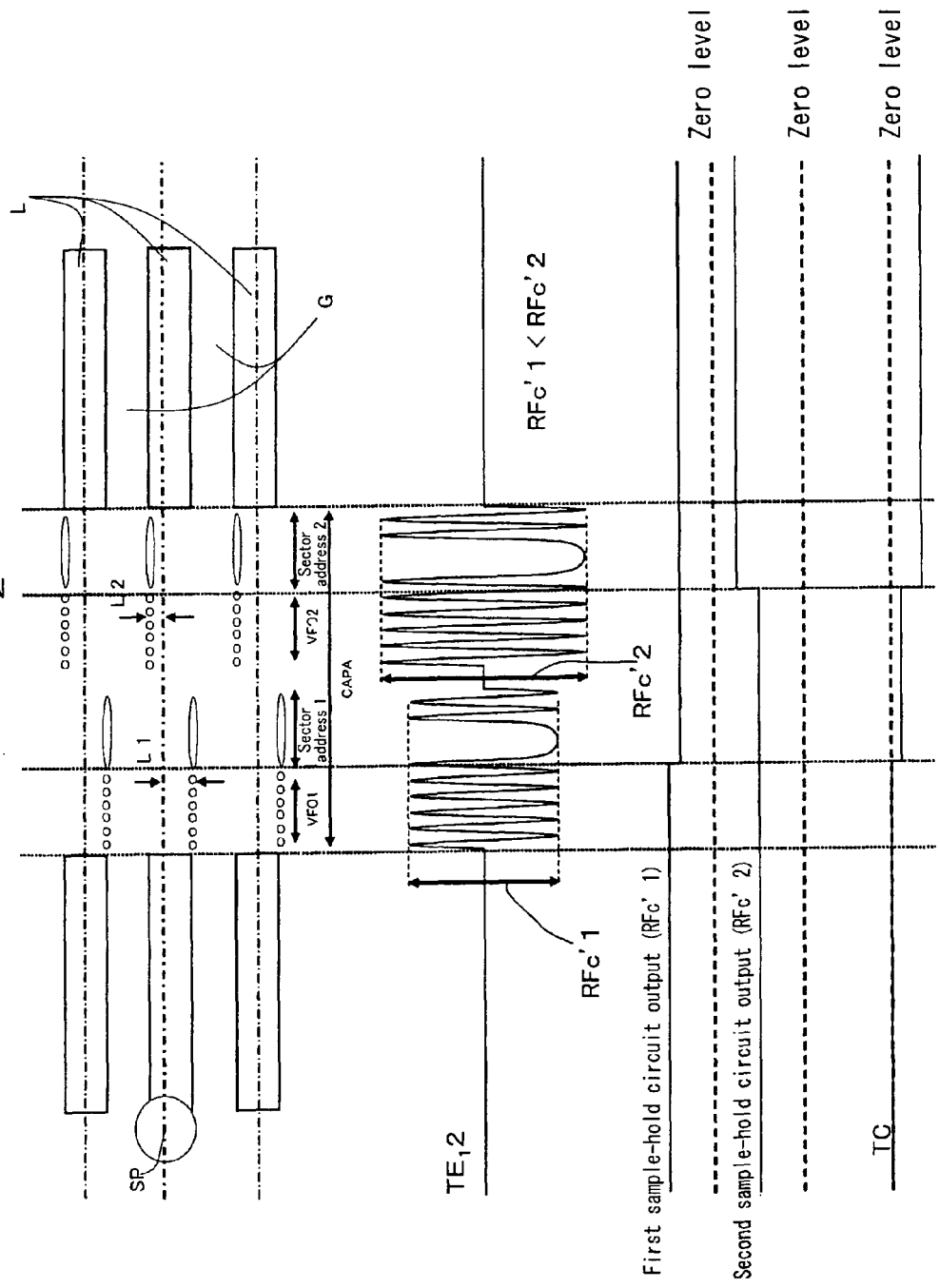
FIG. 12 is a fourth waveform diagram showing the relation between the light beam and the second TE add signal.

The second differential circuit 55 calculates the difference between the amplitude RFc'1 of the VFO1 and the amplitude RFc'2 of the VFO2, and outputs the calculated difference to the second tracking control circuit 27 as a second TE signal TC. Specifically, in the case where RFc'1=RFc'2, the second differential circuit 55, as shown in FIG. 10, outputs the second TE signal TC of zero level. In the case where RFc'1 >RFc'2, on the other hand, the second differential circuit 55, as shown in FIG. 11, outputs a second TE signal TC of one polarity (for example, positive) having a level corresponding to the difference between the amplitude RFc'1 and the amplitude RFc'2. Further, in the case where RFc 1<RFc'2, the second differential circuit 55, as shown in FIG. 12, outputs a second TE signal TC of the other polarity (for example, negative) having a level corresponding to the difference between the amplitude RFc'1 and the amplitude RFc'2.

Hereinafter, the TE correcting operation of the optical disk apparatus according to this embodiment is explained in detail with reference to the flowchart of FIG. 13. The TE control operation described below is basically performed in each circuit based on the command from the microcomputer 31.

Figure 14:
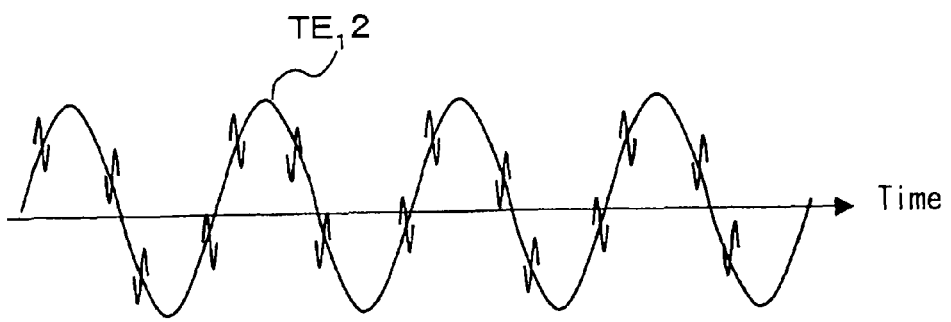
FIG. 14 is a waveform diagram showing a first state of a second TE add signal $TE_1 2$.

First, the focusing operation of the disk motor 4, the light source (laser) 5 and the optical head unit 9 is started (step S101). The output from the second add circuit 23 (the second TE add signal $TE_1 2$) under this condition is shown in FIG. 14. As shown in FIG. 14, at this timing, neither the first TE control operation based on the first TE signal $TE_1$ nor the second TE control operation based on the second TE signal TC is performed, and the disturbance in the low-frequency band is superposed on the second TE add signal $TE_1 2$. Further, the high-frequency component is also superposed on the second TE add signal $TE_1 2$. The disturbance in the low-frequency band is derived from the tracking error amount (TE) detected due to the spot "sp" passing across the track on the disk 1. This frequency is substantially proportional to the eccentricity amount of the disk 3 and the rotational speed of the motor 10. The high-frequency component is a signal component used for the second TE control operation and described in detail later.

In this state, the first tracking control switch 24 is closed, and the first TE control operation based on the first TE control signal TEOUT is started (step S102). In the process, the second tracking control switch 28 is not closed (open), and the second TE control signal TCOUT is not supplied to the second add circuit 23. The first tracking control circuit 25, therefore, performs only the first TE control operation based on the first TE control signal TEOUT that is not corrected by the second TE control signal TCOUT.

Figure 15:
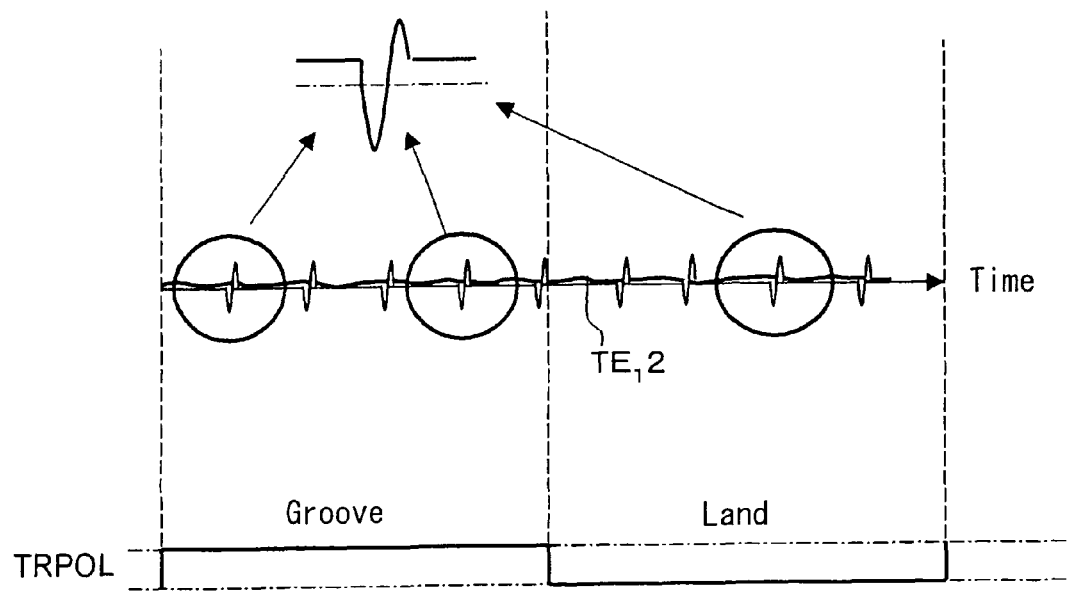
FIG. 15 is a waveform diagram showing a second state of the second TE add signal $TE_1 2$.

The output state in the second add circuit 23 (second TE add signal $TE_1 2$) in step S102 is shown in FIG. 15. As shown in FIG. 15, at this timing, the first TE control operation is performed based on the first TE signal $TE_1$, but the second TE control operation based on the second TE signal TC is not performed. Specifically, the spot "sp", though scanned on the track of the disk 3, is not controlled to scan the track center. As a result, though the low-frequency disturbance is substantially removed from the second TE add signal $TE_1 2$, the high-frequency component is superposed thereon wherein the high-frequency component is accompanied by the amplitude variation.

Also, the output state of the electrical signal RF in step S102 is shown in FIG. 16. As shown in FIG. 16, at this timing, the high-frequency component is superposed on the electrical signal RF at the same timing of the TE add signal $TE_1 2$ wherein the high-frequency component is accompanied by the amplitude variation.

Also, the output state of the second TE signal TC in step S102 is shown in FIG. 17. At this timing, the second tracking control switch 28 is open, and the second TE control operation (the control operation for adding the second TE signal TC to the first TE signal $TE_1$) based on the second TE signal TC is not performed. As a result, as shown in FIG. 17, the second TE signal TC is not converged to zero level but maintains the respective value (TC level 2_G, TC level 2_L) on the groove track and the land track.

It should be noted here that the timing at which the high-frequency component is superposed on the second TE add signal $TE_1 2$ and the electrical signal RF coincides with the timing at which the light beam of the focusing lens 10 passes through the header area "α". Further, in accordance with the degree of displacement of the light beam from the track, a delicate difference occurs between the amplitude RFc'1 of the high-frequency component when the light beam passes through the CAPA1 area and the amplitude RFc'2 of the high-frequency component when the light beam passes through the CAPA2 area.

This is by reason that the light beam is radiated uniformly on the CAPA1 area and the CAPA2 area in the case where the light beam is not displaced from each track, while the light beam is not radiated uniformly on the CAPA1 area and the CAPA2 area in the case where the light beam is displaced from each track.

In the TE control apparatus according to this embodiment and the TE control apparatus that becomes a target to embody the invention, the second TE signal TC corresponding to the amplitude non-uniformity of this high-frequency component is generated, and the second TE signal TC thus generated is added to the first TE signal $TE_1$. As a result, the non-uniformity of the high-frequency amplitude is corrected to enhance TE accuracy. This is the second TE control operation. At the timing shown in step S102, however, the second TE control operation is not started.

Next, the second tracking control switch 28 is closed in this state (step S103). As a result, the second tracking control switch 28 outputs the second TE control signal TCOUT to the second add circuit 23, which in turn adds the supplied second TE control signal TCOUT to the first TE signal $TE_1$. Thus, the second TE control operation is started at the timing of step S103.

At the timing when step S103 is started, the microcomputer 31 clears the add data (TCOFS_L, TCOFS_G) to zero, and the add data (TCOFS_L, TCOFS_G) of zero level is added to the first TE add signal $TE_1 1$ outputted from the first add circuit 22.

Figure 18:
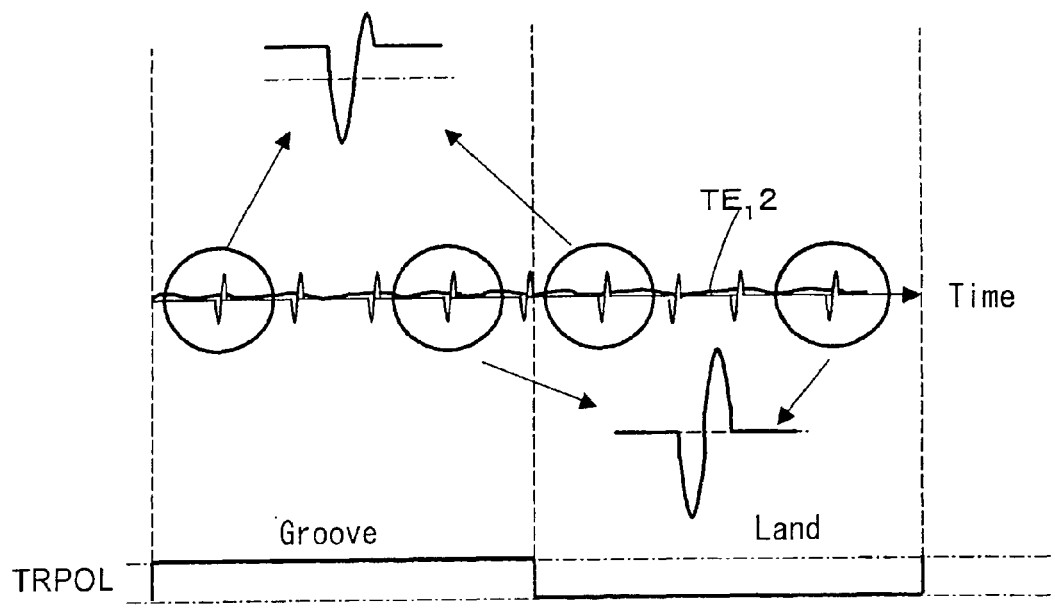
FIG. 18 is a waveform diagram showing a third state of the second TE add signal $TE_1 2$.
Figure 19:
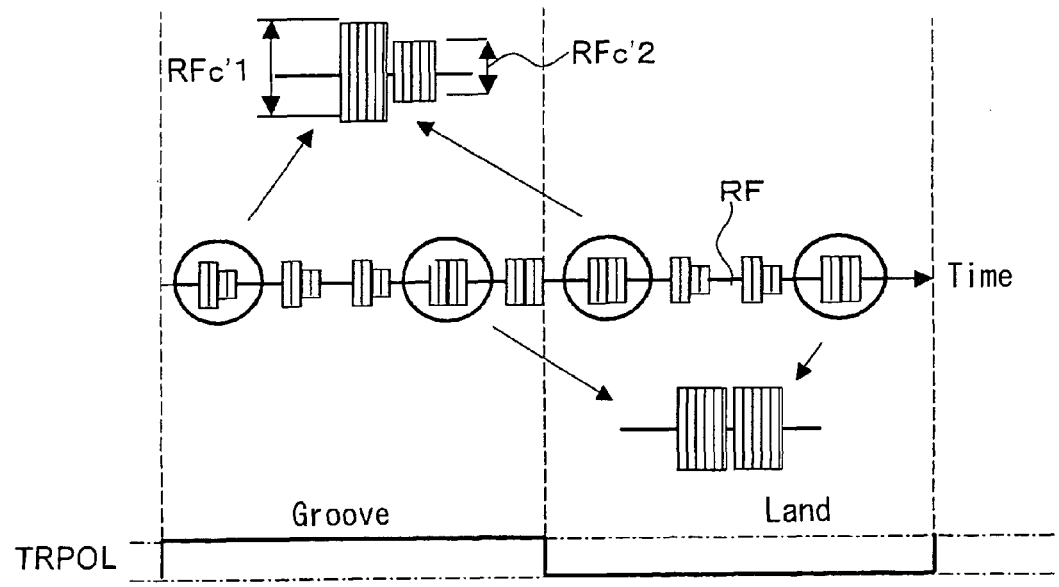
FIG. 19 is a waveform diagram showing a second state of the electrical signal RF.
Figure 20:
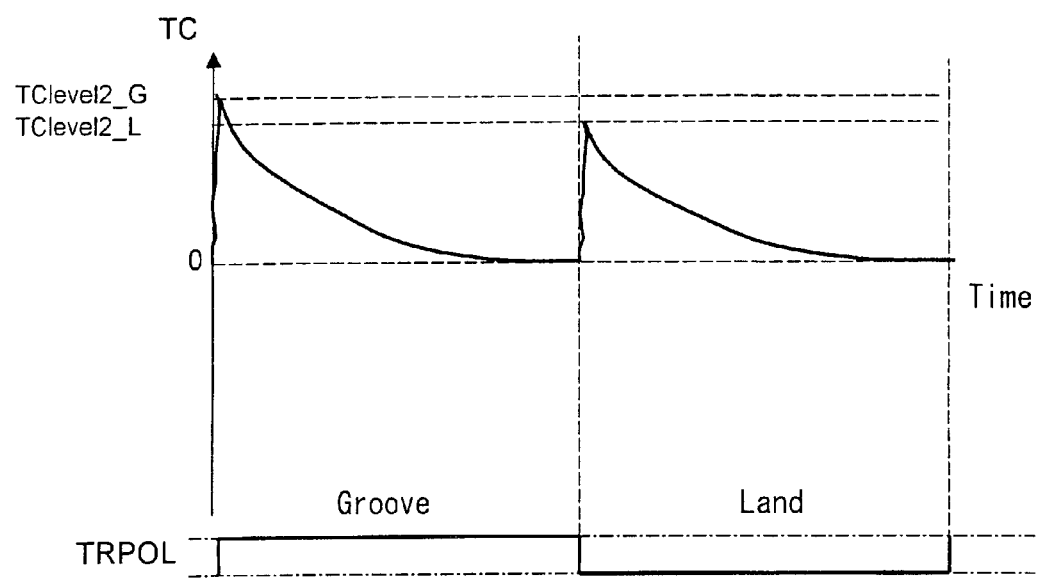
FIG. 20 is a waveform diagram showing a second state of the second TE signal TC.
Figure 21:
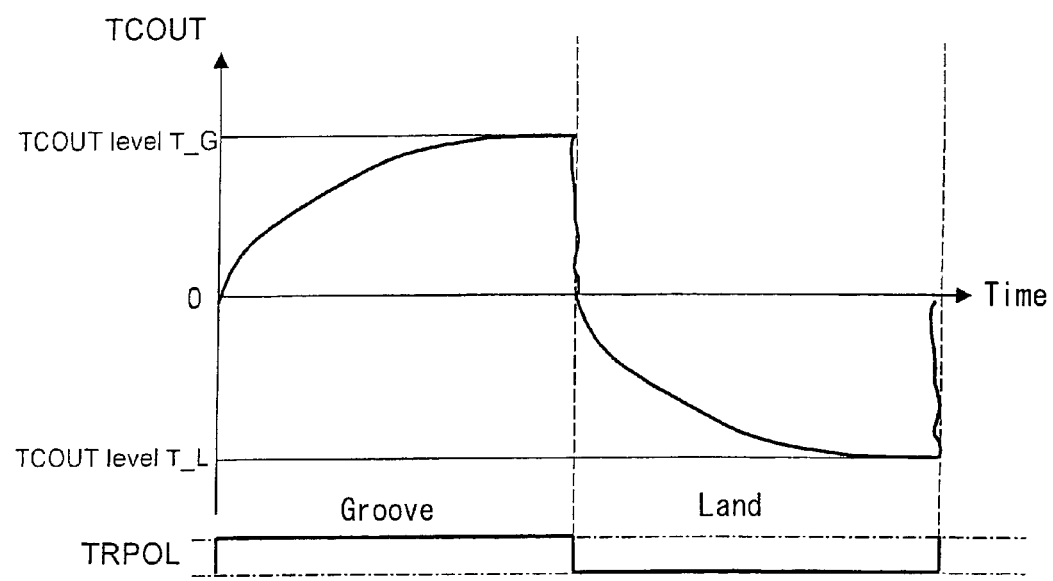
FIG. 21 is a waveform diagram showing a first state of a second TE control signal TCOUT.
Figure 22:
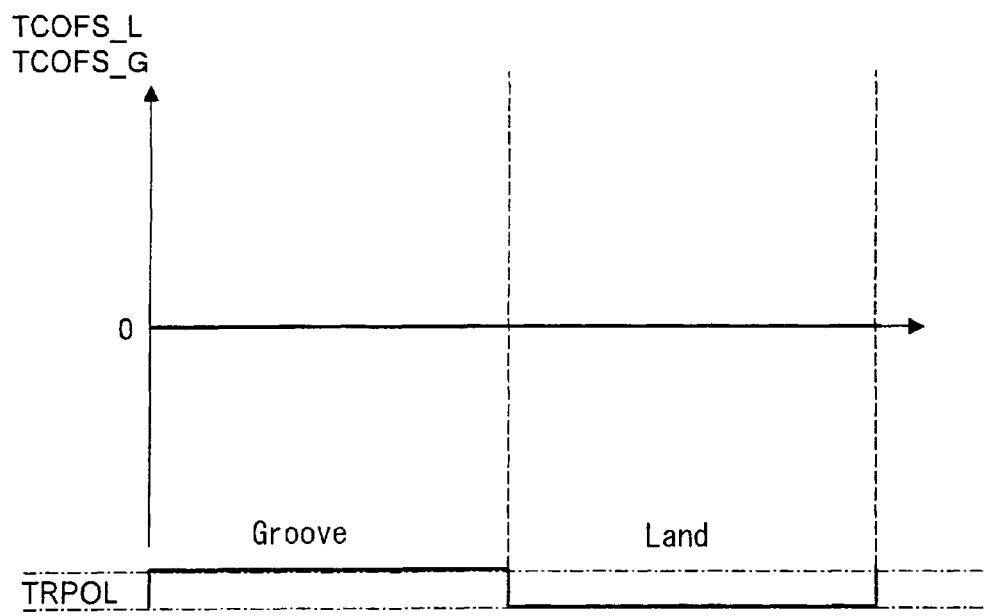
FIG. 22 is a waveform diagram showing a first state of the add data (TCOFS_L, TCOFS_G)
Figure 23:
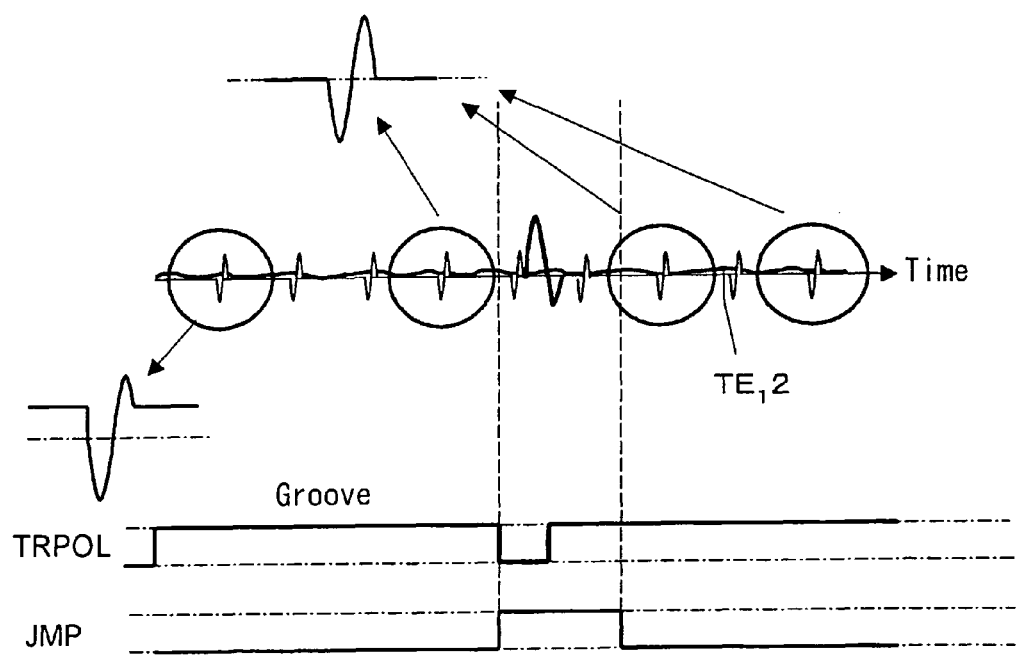
FIG. 23 is a waveform diagram showing a fourth state of the second TE add signal $TE_1 2$.

The output state of the second add circuit 23 (the second TE add signal $TE_1 2$) at the timing of step S103 is shown in FIG. 18, the output state of the electrical signal RF at the timing of step S103 is shown in FIG. 19, the output state of the second TE signal TC at the timing of step S103 is shown in FIG. 20, the output state of the second TE control signal TCOUT at the timing of step S103 is shown in FIG. 21, and the output state of the add data (TCOFS_L, TCOFS_G) at the timing of step S103 is shown in FIG. 22, respectively.

At this timing, the first TE control operation based on the first TE signal $TE_1$ and the second TE control operation based on the second TE signal TC are carried out together. Specifically, the spot "sp" scans the track on the disk 3, and further is controlled at the center (track center) of CAPA1 and CAPA2 on the header area "α". As a result, the low-frequency disturbance is substantially removed from the second TE add signal $TE_1 2$, and further, the high-frequency disturbance (amplitude variation) is converged in each the land tracks and the groove tracks. Specifically, although the difference is comparatively large between the amplitude RFc'1 and the amplitude RFc'2 of the electrical signal RF in the neighborhood of the starting edge of the timing of each track, the amplitude difference is converged substantially to zero in the neighborhood of the dead end of the timing of each track.

The amplitude difference is not converged, however, unless it is located in the vicinity of the dead end of the timing of the groove track and the land track. This delayed convergence of the amplitude difference is the problem to be dealt with by the invention, as the reason thereof is described above in the section of the problem to be solved by the invention.

The aforementioned convergence characteristic of the amplitude difference arises also in the electrical signal RF shown in FIG. 19, and further, in the signal level of the second TE signal TC shown in FIG. 20 and the second TE control signal TCOUT shown in FIG. 21. Specifically, the second TE signal TC, after reaching the maximum value (TC level 2_G, TC level 2_L) in the neighborhood of the starting edge of the track, converges at level 0 (or level almost 0) that is a target value only after it is located in the neighborhood of the dead end of the track. In response to it, the second TE control signal TCOUT finally reaches the target value (TCOUT level T_G) and the target value (TCOUT level T_L) only after it is located in the neighborhood of the track dead end.

Furthermore, at this time, the microcomputer 31 has cleared the add data (TCOFS_L, TCOFS_G) to zero. As shown FIG. 22, therefore, the add data (TCOFS_L, TCOFS_G) outputted from the microcomputer 31 to the first add circuit 22 is at zero level.

Next, in this state, the still jump is started and the light beam of the focusing lens 10 is held in the groove track G. Specifically, the still jump command JMP outputted from the microcomputer 31 to the optical head unit 9 is set to "H" level at each rotation. By doing so, the light beam of the focusing lens 10 is held by still jumping to the groove track. While carrying out the still jump (groove), after the second tracking control signal measuring circuit 29 is cleared, the measurement operation is performed. Specifically, the microcomputer 31 outputs the clear command CLR and the measurement command START to the second tracking control signal measuring circuit 29. The second tracking control signal measuring circuit 29 executes the measurement in response to those command (step S104).

The output state of the second add circuit 23 at the timing of step S104 (second TE add signal $TE_1 2$) is shown in FIG.

Figure 24:
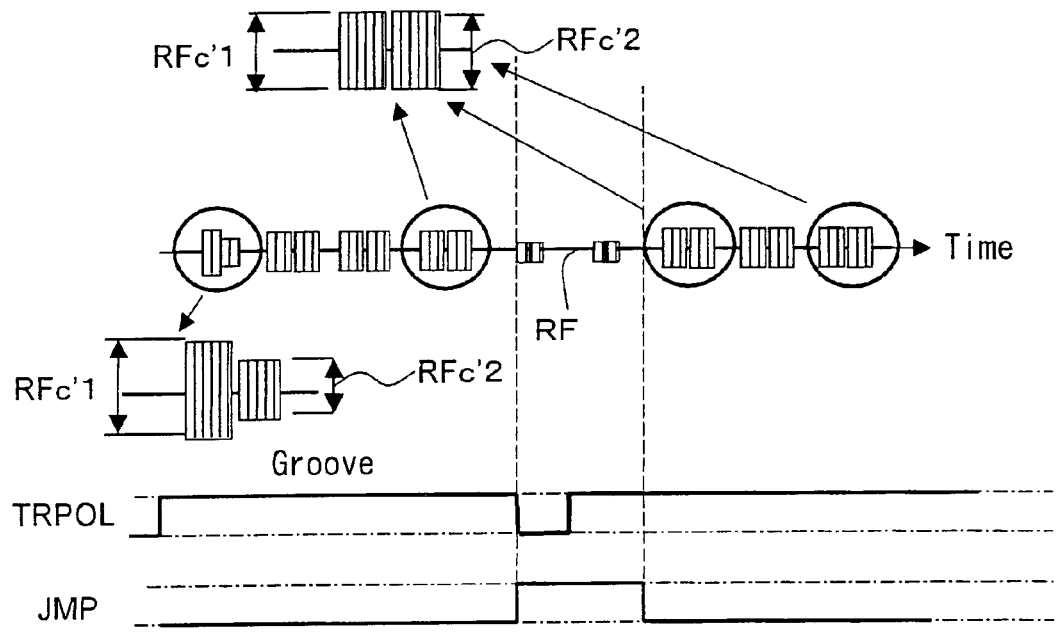
FIG. 24 is a waveform diagram showing a third state of the electrical signal RF.
Figure 25:
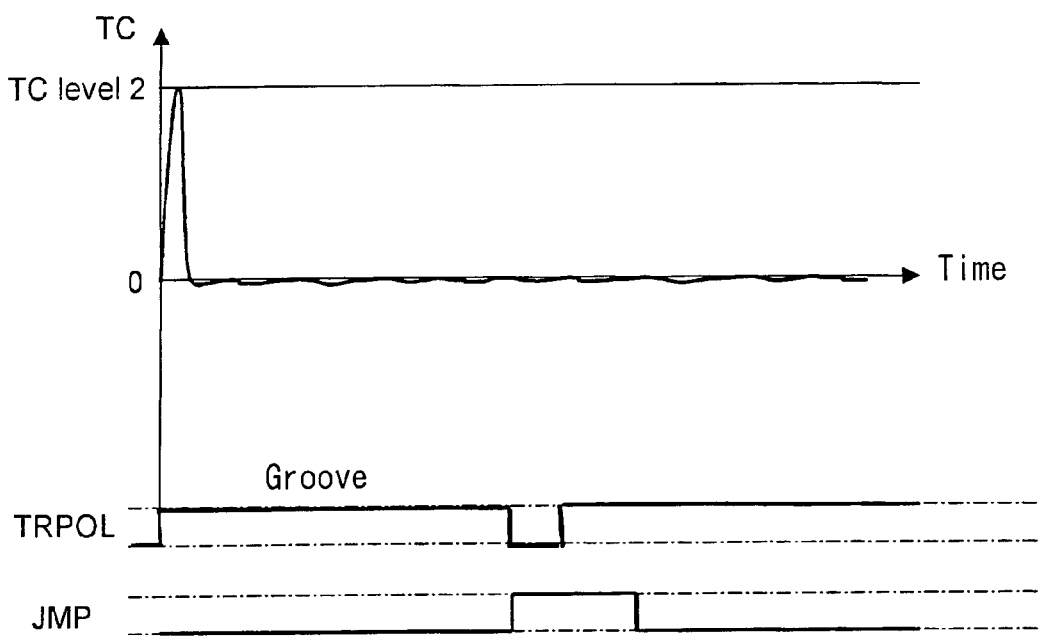
FIG. 25 is a waveform diagram showing a third state of the second TE signal TC.
Figure 26:
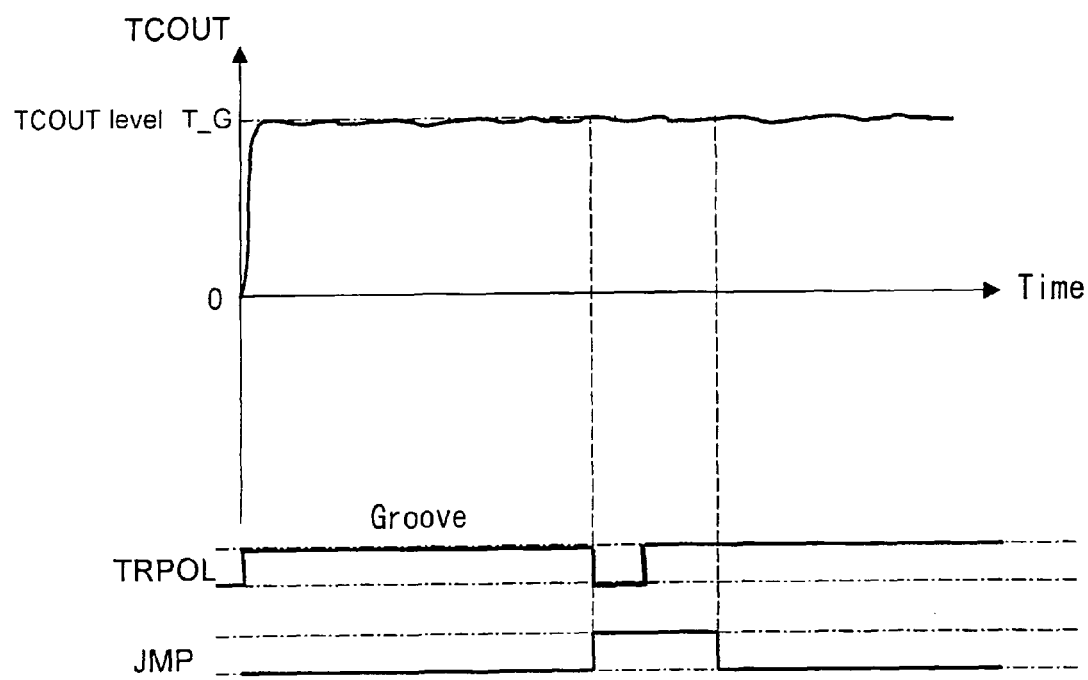
FIG. 26 is a waveform diagram showing a second state of the second TE control signal TCOUT.
Figure 27:
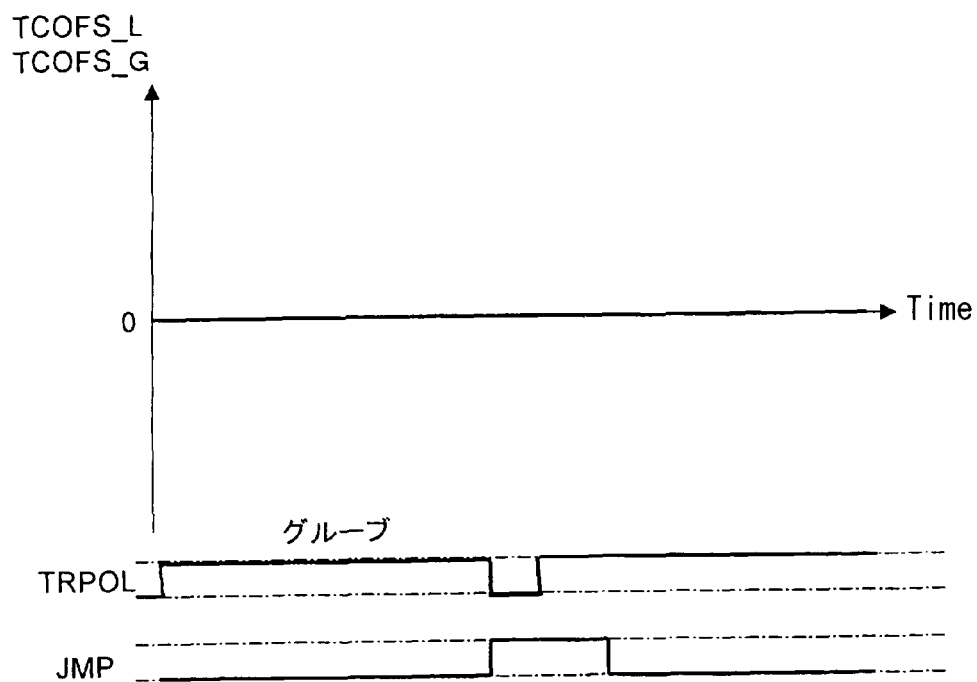
FIG. 27 is a waveform diagram showing a second state of the add data (TCOFS_L, TCOFS_G)

23, the output state of the electrical signal RF at the timing of step S104 is shown in FIG. 24, the output state of the second TE control signal TC at the timing of step S104 is shown in FIG. 25, the output state of the second TE control signal TCOUT at the timing of step S104 is shown in FIG. 26, and the output state of the add data (TCOFS_L, TCOFS_G) at the timing of step S104 is shown in FIG. 27, respectively.

In order that the light beam of the focusing lens 10 may trace on the single groove track G at this timing, the amplitude RFc'1 and the amplitude RFc'2 of the high-frequency component superposed on the first TE signal $TE_1$ quickly converge to the same value each other immediately after starting the process of step S104. At this time, the second TE signal TC, after reaching the maximum value TC level 2 immediately after starting the process of step S104, is quickly converged to level 0 (or almost level zero). In response, the second TE control signal TCOUT is stabilized by reaching the target value (TCOUT level T_G) immediately after starting the process of step S104. The second tracking control signal measuring circuit 29 measures the stabilized target value (TCOUT level T_G), and outputs the measurement result to the microcomputer 31. The microcomputer 31 calculates and stores the add data (TCOFS_G) based on the target value supplied (TCOUT level T_G) (step S105).

The method of calculating the add data (TCOFS_G), for example, multiplying the target value (TCOUT level T_G) by k times (0<k<1) is shown as an example, where k is arbitrarily set to enhance the control rapidity after suppressing the overcontrol. Also, various methods of measuring the measurement result (target value (TCOUT level T_G) and calculating the add data (TCOFS_G) are conceivable and it is described later with respect to those.

In addition, at this time, though the microcomputer 31 calculates and stores the add data (TCOFS_G) based on the target value (TCOUT level T_G), but keeps the add data (TCOFS_L, TCOFS_G) in a state cleared to zero in step S103. As a result, the add data (TCOFS_L, TCOFS_G) outputted from the microcomputer 31 to the first add circuit 22 remains at zero level as shown in FIG. 27.

Next, in this state, the still jump is started and the light beam of the focusing lens 10 is held in the land track L. Specifically, the still jump command JMP outputted from the microcomputer 31 to the optical head unit 9 is set to "H" level at each rotation. By doing so, the light beam of the focusing lens 10 is held by still jumping to the land track L. While carrying out the still jumping (land), after the second tracking control signal measuring circuit 29 is cleared, the measurement operation is performed. Specifically, the microcomputer 31 outputs the clear command CLR and the measurement command START to the second tracking control signal measuring circuit 29, which executes the measurement in response to those commands (step S106).

Figure 30:
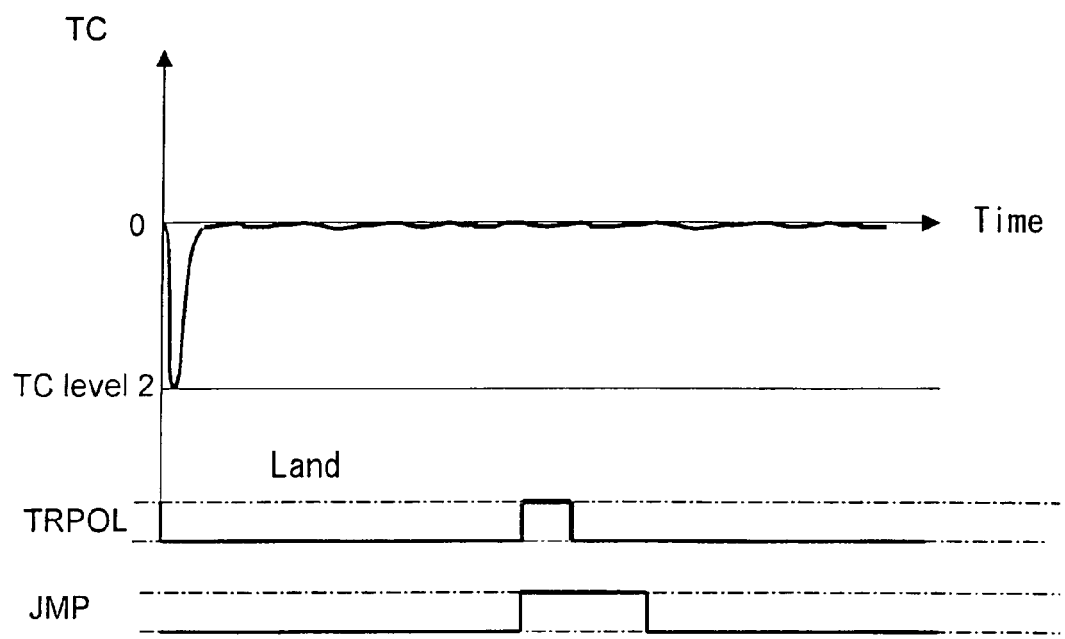
FIG. 30 is a waveform diagram showing a fourth state of the second TE signal TC.
Figure 31:
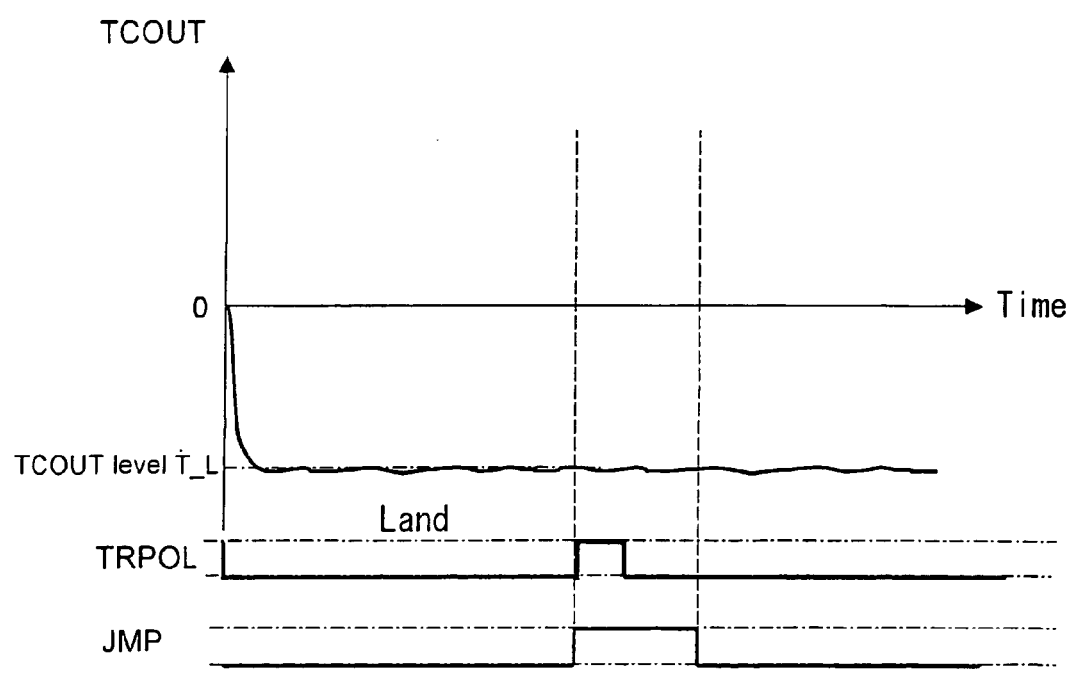
FIG. 31 is a waveform diagram showing a third state of the second TE control signal TCOUT.
Figure 32:
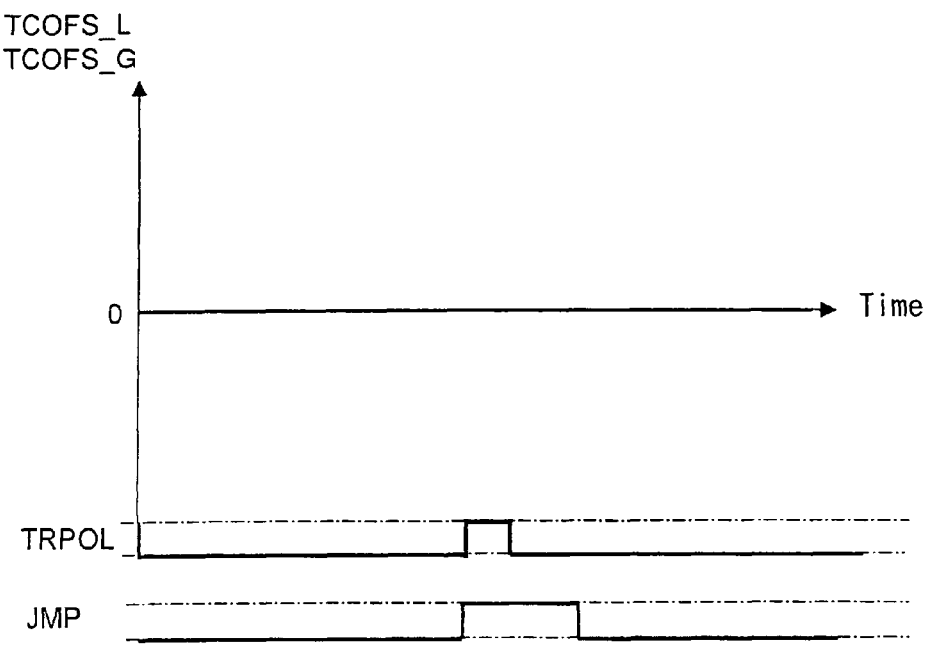
FIG. 32 is a waveform diagram showing a third state of the add data (TCOFS_L, TCOFS_G)

The output state of the second add circuit 23 at the timing of step S106 (second TE add signal $TE_1 2$) is shown in FIG. 28, the output state of the electrical signal RF at the timing of step S106 is shown in FIG. 29, the output state of the second TE signal TC at the timing of step S106 is shown in FIG. 30, the output state of the second TE control signal TCOUT at the timing of step S106 is shown in FIG. 31, and the output state of the add data (TCOFS_L, TCOFS_G) at the timing of step S106 is shown in FIG. 32, respectively.

In order that the light beam of the focusing lens 10 traces on the single land track L at this timing, the amplitude RFc'1 and the amplitude RFc'2 of the high-frequency component superposed on the first TE signal $TE_1$ quickly converge to the same value each other immediately after starting the measurement. At this time, the second TE signal TC, after reaching the maximum value (TC level 2) immediately after starting the measurement, is quickly converged to level 0 (or almost level zero). In response to it, the second TE control signal TCOUT is stabilized by reaching the target value (TCOUT level T_L) immediately after starting the measurement. The second tracking control signal measuring circuit 29 measures the stabilized target value (TCOUT level T_L), and outputs the measurement result to the microcomputer 31 (step S107).

The microcomputer 31 calculates and stores the add data (TCOFS_L) based on the target value supplied (TCOUT level T_L). The method of calculating the add data (TCOFS_L) and the method of measuring the target value (TCOUT level T_L) are similar to those for the groove track G (step S108).

Furthermore, at this time, though the microcomputer 31 calculates and stores the add data (TCOFS_L) based on the target value (TCOUT level T_L), but keeps the add data (TCOFS_L, TCOFS_G) in a state cleared to zero in step S103. As a result, the add data (TCOFS_L, TCOFS_G) outputted from the microcomputer 31 to the first add circuit 22 remains at zero level as shown in FIG. 32.

By executing the process of steps S101 to S108 as described above, the microcomputer 31 calculates and stores the add data (TCOFS_L, TCOFS_G). In this state, the tracking control block 200 continuously stops the still jump control, and then starts the normal TE control operation. In the subsequent TE control, however, the first TE signal $TE_1$ is corrected based on the add data (TCOFS_L, TCOFS_G) stored in the microcomputer 31 thereby to enhance the accuracy of TE control (step S109).

Figure 33:
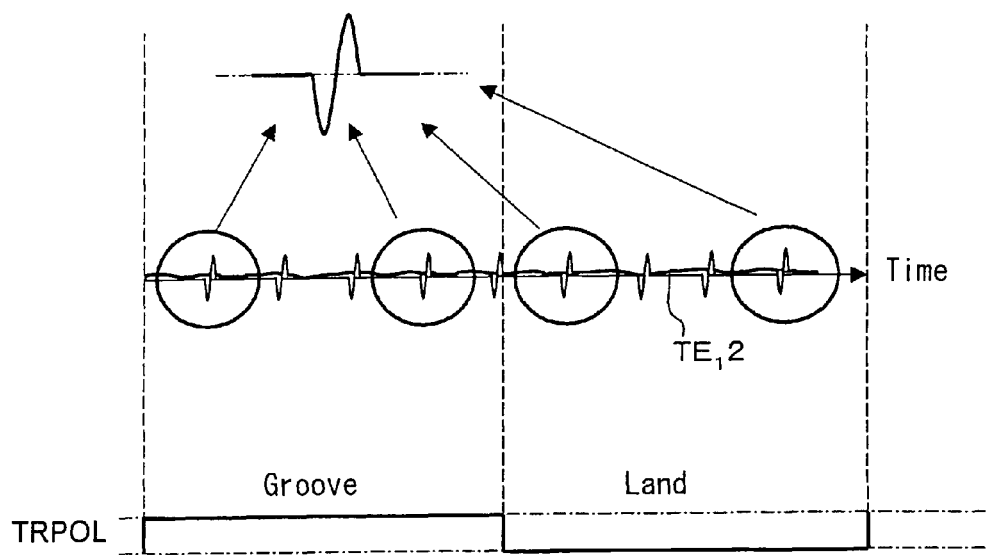
FIG. 33 is a waveform diagram showing a sixth state of the second TE add signal $TE_1 2$.

The output state of the second add circuit 23 at the timing of step S109 (second TE add signal $TE_1 2$) is shown in FIG. 33, the output state of the electrical signal RF at the timing of step S108 is shown in FIG. 34, the output state of the second TE signal TC at the timing of step S109 is shown in FIG. 35, the output state of the second TE control signal TCOUT at the timing of step S109 is shown in FIG. 36, and the output state of the add data (TCOFS_L, TCOFS_G) at the timing of step S109 is shown in FIG. 37, respectively.

Once the process of step S109 is started, the microcomputer 31 performs the first TE control operation based on the first TE signal $TE_1$ and the second TE control operation based on the second TE signal TC together, while outputting the add data (TCOFS_L, TCOFS_G) to the first add circuit 22 at the same time. As a result, the first add circuit 22 starts the process of adding the add data (TCOFS_L, TCOFS_G) shown in FIG. 37 to the first TE signal TE1, the same add process is continued after that.

As a result, the TE control of the head unit 9 is carried out based on the second TE control signal TCOUT to which the add data (TCOFS_L, TCOFS_G) is added. The second TE signal TC generated by the second TE detection circuit 26 based on the electrical signal RF outputted from the optical head unit 9 subjected to the TE control in such way, as shown in FIG. 35, is converged to zero level (almost zero level) quickly in the neighborhood of the starting edge of the track. As shown in FIG. 36, therefore, the second TE control signal TCOUT is also quickly converged to the target value (TCOUT level T_G, TCOUT level T_L) in the neighborhood of the starting edge of the track.

This rapidity of control operation is achieved by adding the add data (TCOFS_L, TCOFS_G) to the first TE signal $TE_1$. This is due to the fact that even in the case where the spot "sp" scans the switching point of the land track and the groove track, the initial value for the second TE control is controlled approximately at the target value (TCOUT level T_G, TCOUT level T_L) by adding the add data (TCOFS_L, TCOFS_G). Without changing the second TE control characteristic, therefore, the spot "sp" can be always controlled at the center of the CAPA1 and the CAPA2 (track center) on the header area "α".

There are the seven methods described below with respect to the measurement method of the target value (TCOUT level T_G, TCOUT level T_L) and the calculation method of the add data (TCOFS_L, TCOFS_G) with the microcomputer 31.

(1) In the land track or the groove track at the single point of an arbitrary track position (radial position) of the disk, the second TE control signal TCOUT (TCOUT_G or TCOUT_L) is measured, and based on this measurement result, the add data (TCOFS) shared by the land track and the groove tack is calculated. In order to share the add data (TCOFS), however, the polarity of one of the add data (TCOFS_L, TCOFS_G) is required to be inverted.

(2) Though it is similar to the method (1) described above, the second TE control signal TCOUT is measured at a plurality of points and the average value thereof is used as a measurement value.

(3) though it is similar to the method (2) described above, the measurement value is multiplied by a variation based on Formula 1 or 2 shown in FIG. 38, and the product is used as a measurement value.

(4) In the land track and the groove track at a single point of an arbitrary track position (radial position) of the disk, the second TE control signal TCOUT_G and the second TE control signal TCOUT_L are measured, and based on the measurement result, the add data (TCOSF_L) for the land track and the add data (TCOSF_G) for the groove track are calculated.

(5) Though it is similar to the method (4) described above, the second TE control signal (TCOUT_G, TCOUT_L) is measured at a plurality of points and the average value thereof is used as a measurement value.

(6) Though it is similar to the method (5) described above, the measurement value is multiplied by a variation based on Formula 1 or 2 shown in FIG. 38, and the product is used as a measurement value.

(7) In the land track and the groove track at a plurality of points of arbitrary track positions (radial positions) of the disk, the second TE control signal TCOUT_G and the second TE control signal TCOUT_L are measured, and based on the measurement result, the add data (TCOSF_L) for the land track and the add data (TCOSF_G) for the groove track are calculated in each of the measurement points.

Figure 39:
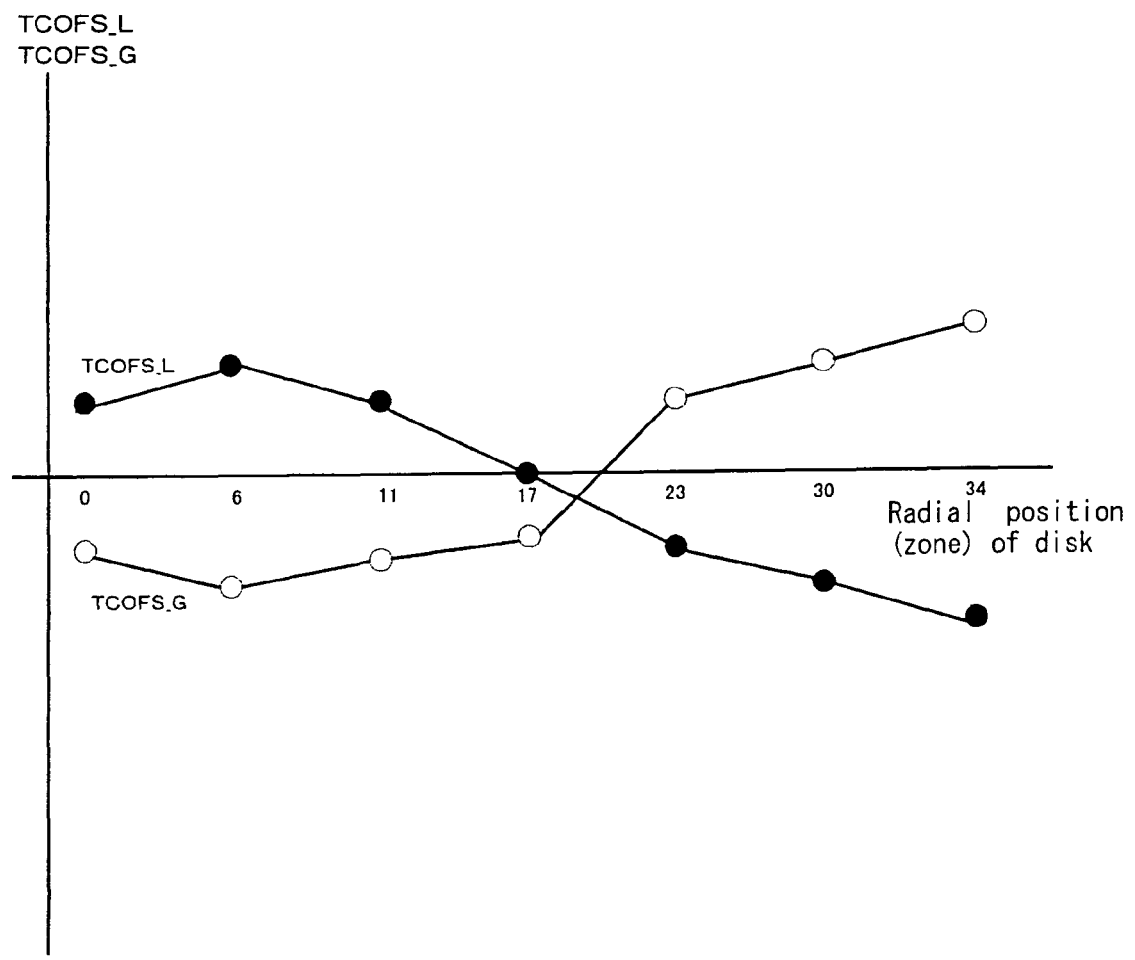
FIG. 39 is a diagram showing an example of the set position of the add data (TCOFS_L, TCOFS_G)

In carrying out the method (7), it is required to classify the recording area of the optical disk by each of the add target areas (zone) according to the measurement point of the second TE control signals TCOUT_G, TCOUT_L. Further, when the add data (TCOFS_L, TCOFS_G is added, those data corresponding to the classified add target areas are required to be added. In FIG. 39, the target value (TCOUT level T_G, TCOUT level T_L) is measured at seven points on the optical disk (radial position 0, radial position 6, radial position 11, radial position 17, radial position 23, radial position 30 and radial position 34) in order to set the add data (TCOFS_L, TCOFS_G) in accordance with the radial position. In the areas between the plurality of the set points (7 points in the drawing), the add data (TCOFS L, TCOFS_G) located at any one of the two end points may be used, or the add data (TCOFS_L, TCOFS_G) located at the two ends may be separately calculated by linear interpolation. The linear interpolation is more desirable for enhancing the control accuracy.

Figure 13:
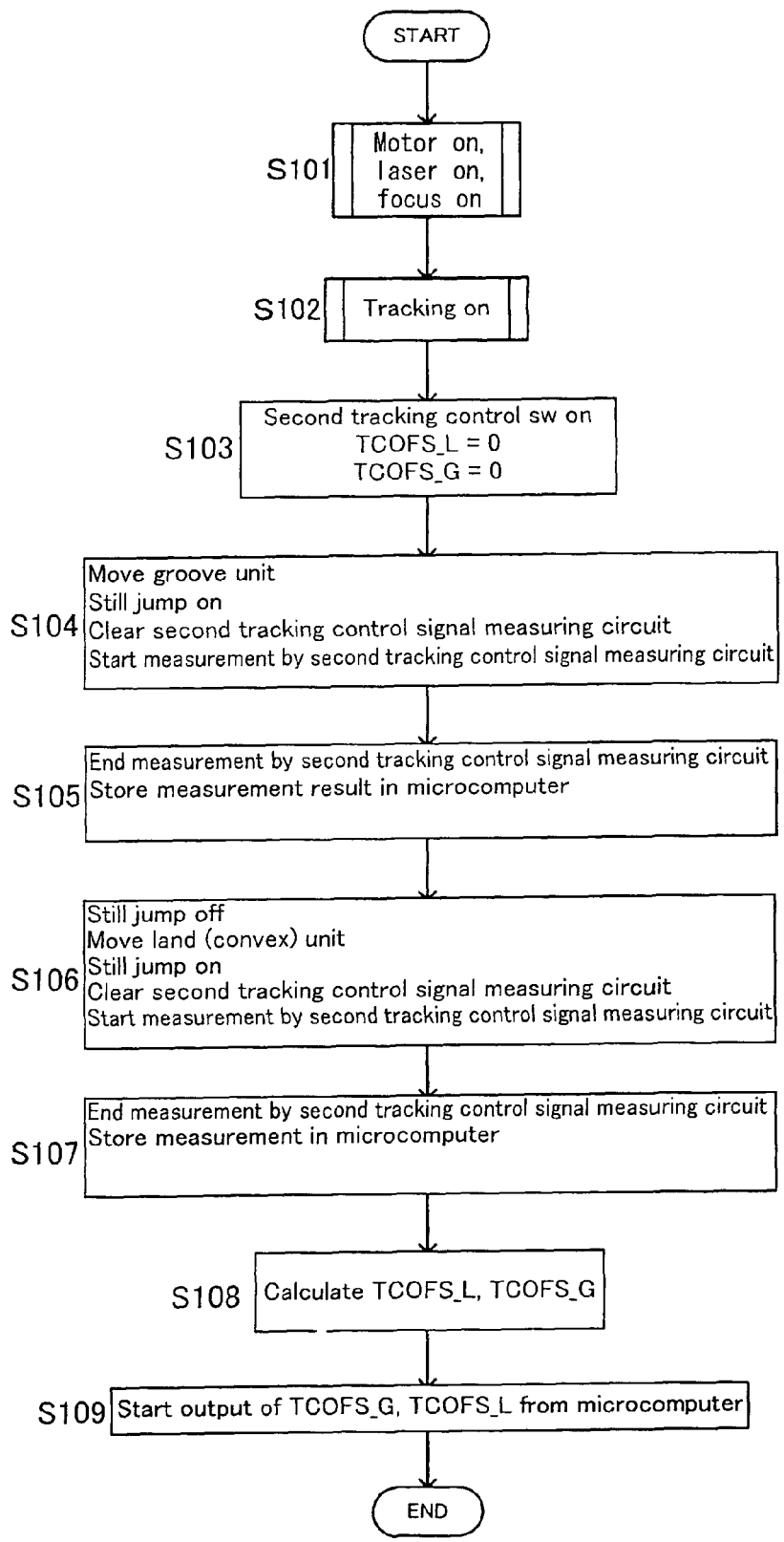
FIG. 13 is a flowchart showing the TE control operation of the optical disk apparatus according to the first embodiment.

Among the add data calculation methods (1) to (7) described above, the methods (1) and (4) can be carried out substantially according to the flowchart of FIG. 13 described above. The methods (2), (3), (5), (6) and (7) are required to be carried based on the flowchart of FIG. 40 obtained by the modification of the flowchart of FIG. 13 described above.

Figure 40:
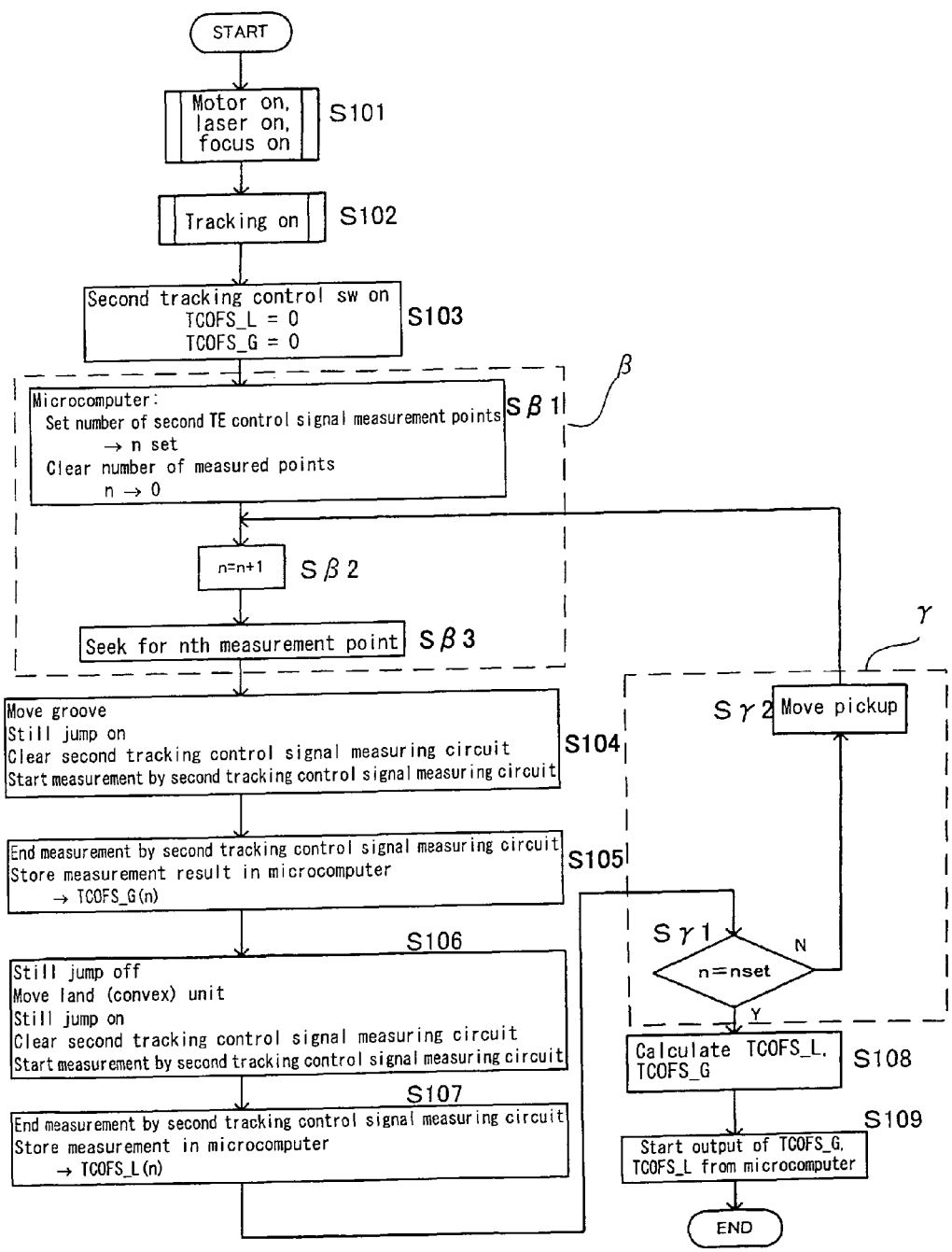
FIG. 40 is a flowchart showing another example of the TE control operation of the optical disk apparatus according to the first embodiment.

The process of the flowchart shown in FIG. 40 is explained. This process is carried out, in the flowchart of FIG. 13, by incorporating the processes "β" between steps S103 and S104, and the processes "γ" between steps S107 and S108.

The processes "β" include the process (step Sβ1) of setting the number of the measurement points of the second TE control signal TCOUT and thereafter clearing the number n of the measured points to zero, the process (step Sβ2) of adding 1 to the number n of the measured points cleared to zero (step Sβ1), and the process (step Sβ3) of moving the light beam of the focusing lens 10 to the "n" th (=n+1) measurement point on the optical disk subjected to the add process.

The processes "γ" include the process (step Sγ1) of judging whether or not the measurement point n has reached the preset number of measurement points (n set) after completing the measurement process (step S107) of the target value (TCOUT level T_G, TCOUT level T_L) at the n'th measurement point by the microcomputer 31, and the process (step Sγ2) of returning to step Sβ2 after moving the light head unit 9 to the next measurement point "n+1" in the case that the preset number of measurement points (n set) is judged not to be reached in step Sγ1.

When it is judged in step Sγ1 that the preset number of measurement points (n set) is reached, the process makes the transition to step S108 of calculating the add data (TCOFS_L, TCOFS_G) based on judgment that the measurement of the second TE control signal TCOUT at all the measurement points is completed.

Furthermore, in the process of step S108, the add data (TCOFS_L, TCOFS_G) is calculated using the methods (2), (3), (5), (6) and (7) based on the plurality of the measurement results (second TE control signal TCOUT). In the methods (2) and (5), the process of averaging the measurement results is conducted as a preliminary process for calculating the add data (TCOFS_L, TCOSF_G) in step S108.

The most preferred specific embodiments of the invention are described in detail above, and the combinations and the arrangement of the parts in these preferred embodiments can be variously modified without departing from the spirit and scope of the appended claims of the invention.

What is claimed is:

1. A tracking error control apparatus comprising:
a reproduction signal detector for irradiating a light beam on an optical disk, and detecting information recorded in the optical disk as a reproduction signal, the optical disk having a track along a circumferential direction, a first pit string disposed on a surface of the optical disk so as to be displaced in a first side along a radial direction from a center of the track, and a second pit string disposed on the surface of the disk so as to be displaced in a second side along the radial direction opposite to the first side;
a scanner for positioning the light beam irradiated on the optical disk;
a first tracking error detector for detecting a first positional error of the light beam with respect to the track by a push-pull method and, outputting a first displacement detection result;
a first tracking error controller for setting a target position of the light beam on the track based on the first displacement detection result so as to control the scanner in such a manner that the light beam follows the target position;
a second tracking error detector for detecting a second positional error of the light beam with respect to the track based on comparison of the reproduction signal in the first string and the reproduction signal in the second pit string, and outputting a second displacement detection result;

a second tracking error controller for correcting the target position of the first tracking error controller based on the second displacement detection result; and a third tracking error controller for calculating correction data for the first displacement detection result based on a correction amount of the target position corrected by the second tracking error controller, and correcting the first displacement detection result based on the calculated correction data.

2. A tracking error control apparatus according to claim 1, wherein the track has a convex land track and a concave groove track arranged alternately in the radial direction of the disk.

3. A tracking error control apparatus according to claim 2, wherein the third tracking error controller calculates the correction data of the first position detection result which is used for both of by the groove track and the land track, based on the second displacement detection result.

4. A tracking error control apparatus according to claim 3, wherein the third tracking error controller calculates the correction data of the first position detection result based on the second displacement detection result at an arbitrary single position on the track detected by the second tracking error detector.

5. A tracking error control apparatus according to claim 3, wherein the third tracking error controller calculates the correction data of the first position detection result based on the second displacement detection result at a plurality of positions on the track detected by the second tracking error detector.

6. A tracking error control apparatus according to claim 3, wherein the third tracking error controller calculates the correction data of the first position detection result through multiplying the variation in measurement results by the average value of the second displacement detection result at a plurality of positions on the track detected by the second tracking error detector.

7. A tracking error control apparatus according to claim 3, wherein the third tracking error controller calculates the correction data of the first position detection result corresponding to each of the second displacement detection results at a plurality of positions on the track detected by the second tracking error detector, and corrects the first displacement detection result at each of the plurality of the positions and the neighborhood thereof based on the correction data corresponding to the relevant position.

8. A tracking error control apparatus according to claim 2, wherein the third tracking error controller calculates the correction data of the first position detection result used for the groove track and the correction data of the first position detection result used for the land track respectively, based on the second displacement detection result.

9. A tracking error control apparatus according to claim 8, wherein the third tracking error controller calculates the correction data of the first position detection result based on the second displacement detection result at an arbitrary single position on the track detected by the second tracking error detector.

10. A tracking error control apparatus according to claim 8, wherein the third tracking error controller calculates the correction data of the first position detection result based on the second displacement detection result at a plurality of positions on the track detected by the second tracking error detector.

11. A tracking error control apparatus according to claim 8, wherein the third tracking error controller calculates the correction data of the first position detection result through multiplying the variation in measurement result by the average value of the second displacement detection result at a plurality of positions on the track detected by the second tracking error detector.

12. A tracking error control apparatus according to claim 8, wherein the third tracking error controller calculates the correction data of the first position detection result corresponding to each of the second displacement detection results at the plurality of the positions on the track detected by the second tracking error detector, and corrects the first displacement detection result at each of the plurality of the positions and the neighborhood thereof based on the correction data corresponding to the particular position.

13. A tracking error control apparatus according to claim 1, wherein the second tracking error detector detects the second positional error of the light beam and outputs the second displacement detection result, based on comparison between amplitude of the reproduction signal in the first pit string and amplitude of the reproduction signal in the second pit string.

14. A tracking error control apparatus according to claim 13, wherein the second tracking error detector detects the second positional error of the light beam and outputs the second displacement detection result, based on a difference between the amplitude of the reproduction signal in the first pit string and the amplitude of the reproduction signal in the second pit string.

15. A tracking error control apparatus according to claim 1, wherein the second tracking error controller generates correction data of the target position of the first tracking error controller based on the second displacement detection result and adds the generated correction data to the first displacement detection result.

16. A tracking error control apparatus according to claim 1, wherein the third tracking error controller adds the correction data of the first position detection result to the first displacement detection result.

17. A tracking error control circuit comprising:

a first tracking error detector for detecting, by the push-pull method, a first positional error of a light beam irradiated on an optical disk with respect to a track of the optical disk, and for outputting a first displacement detection result, the optical disk having a first pit string disposed on a surface of the optical disk so as to be displaced in a first side along a radial direction from a center of the track, and a second pit string disposed on the surface of the disk so as to be displaced in a second side along the radial direction opposite to the first side;

a first tracking error controller for setting a target position of the light beam on the track based on the first displacement detection result, and outputting a control signal to make the light beam follow the target position;

a second tracking error detector for detecting a second positional error of the light beam with respect to the track, and outputting a second displacement detection result, based on the comparison between reproduction signals obtained by irradiating the light beam on the first and second pit strings;

a second tracking error controller for correcting the target position of the first tracking error controller based on the second displacement detection result; and a third tracking error controller for calculating correction data for the first displacement detection result based on a correction amount of the target position corrected by the second tracking error controller and correcting the first displacement detection result based on the calculated correction data.

18. A tracking error control circuit according to claim 17, wherein the track includes a convex land track and a concave groove track arranged alternately in the radial direction of the disk.

19. A tracking error control circuit according to claim 18, wherein the third tracking error controller calculates the correction data of the first position detection result which is used for both of the groove track and the land track, based on the second displacement detection result.

20. A tracking error control circuit according to claim 19, wherein the third tracking error controller calculates the correction data of the first position detection result based on the second displacement detection result at an arbitrary single position on the track detected by the second tracking error detector.

21. A tracking error control circuit according to claim 19, wherein the third tracking error controller calculates the correction data of the first position detection result based on the second displacement detection result at a plurality of positions on the track detected by the second tracking error detector.

22. A tracking error control circuit according to claim 19, wherein the third tracking error controller calculates the correction data of the first position detection result through multiplying the variation in measurement result by the average value of the second displacement detection result at a plurality of positions on the track detected by the second tracking error detector.

23. A tracking error control circuit according to claim 19, wherein the third tracking error controller calculates the correction data of the first position detection result corresponding to each of the second displacement detection results at a plurality of positions on the track detected by the second tracking error detector, and corrects the first displacement detection result at each of the plurality of the positions and the neighborhood thereof based on the correction data corresponding to the relevant position.

24. A tracking error control circuit according to claim 18, wherein the third tracking error controller calculates the correction data of the first position detection result used for the groove track and the correction data of the first position detection result used for the land track respectively, based on the second displacement detection result.

25. A tracking error control circuit according to claim 24, wherein the third tracking error controller calculates the correction data of the first position detection result based on the second displacement detection result at an arbitrary single position on the track detected by the second tracking error detector.

26. A tracking error control circuit according to claim 24, wherein the third tracking error controller calculates the correction data of the first position detection result based on the second displacement detection result at a plurality of positions on the track detected by the second tracking error detector.

27. A tracking error control circuit according to claim 24, wherein the third tracking error controller calculates the correction data of the first position detection result through multiplying the variation in measurement result by the average value of the second displacement detection result at a plurality of positions on the track detected by the second tracking error detector.

28. A tracking error control circuit according to claim 24, wherein the third tracking error controller calculates the correction data of the first position detection result corresponding to each of the second displacement detection result at a plurality of positions on the track detected by the second tracking error detector, and corrects the first displacement detection result at each of the plurality of the positions and the neighborhood thereof based on the correction data corresponding to the relevant position.

29. A tracking error control circuit according to claim 17, wherein the second tracking error detector detects the second positional error of the light beam, and outputs the second displacement detection result based on comparison between amplitude of the reproduction signal in the first pit string and amplitude of the reproduction signal in the second pit string.

30. A tracking error control circuit according to claim 29, wherein the second tracking error detector detects the second positional error of the light beam, and outputs the second displacement detection result based on a difference between the amplitude of the reproduction signal in the first pit string and the amplitude of the reproduction signal in the second pit string.

31. A tracking error control circuit according to claim 17, wherein the second tracking error controller generates correction data of the target position of the first tracking error controller based on the second displacement detection result, and adds the generated correction data to the first displacement detection result.

32. A tracking error control circuit according to claim 17, wherein the third tracking error controller adds the correction data of the first position detection result to the first displacement detection result.

33. A tracking error control method for correcting a position of a light beam irradiated on an optical disk, the optical disk having a track along a circumferential direction, a first pit string disposed on a surface of the optical disk so as to be displaced in a first side along a radial direction from the track of the disk and a second pit string disposed on the surface of the optical disk so as to be displaced in a second side along the radial direction of the disk from the track, the method comprising while detecting information recorded in the optical disk as a reproduction signal, the steps:

a first tracking error detection step for detecting a first positional error of the light beam with respect to the track by the push-pull method, and outputting a first displacement detection result;

a first tracking error control step for setting a target position of the light beam on the track based on the first displacement detection result, and controlling the position of the light beam so that the light beam follows the target position;

a second tracking error detection step for detecting a second positional error of the light beam with respect to the track based on comparison between the reproduction of the first pit string and the reproduction signal of the second pit string, and outputting a second displacement detection result;

a second tracking error control step for correcting the target position of the first tracking error control step based on the second displacement detection result; and a third tracking error control step for calculating correction data of the first displacement detection result based on a correction amount of the target position corrected in the second tracking error control step, and correcting the first displacement detection result based on the calculated correction data.

34. A tracking error control method according to claim 33, wherein the track includes a convex land track and a concave groove track arranged alternately in the radial direction of the disk.

35. A tracking error control method according to claim 34, wherein the third tracking error control step includes the step of calculating the correction data of the first position detection result which is used for both of the groove track and the land track, based on the second displacement detection result.

36. A tracking error control method according to claim 35, wherein the third tracking error control step includes the step of calculating the correction data of the first position detection result based on the second displacement detection result at an arbitrary single position on the track detected in the second tracking error detection step.

37. A tracking error control method according to claim 35, wherein the third tracking error control step includes the step of calculating the correction data of the first position detection result based on the second displacement detection result at a plurality of positions on the track detected in the second tracking error detection step.

38. A tracking error control method according to claim 35, wherein the third tracking error control step includes the step of calculating the correction data of the first position detection result through multiplying the variation in measurement result by the average value of the second displacement detection result at a plurality of positions on the track detected in the second tracking error detection step.

39. A tracking error control method according to claim 35, wherein the third tracking error control step includes the steps of calculating the correction data of the first position detection result corresponding to each of the second displacement detection results at the plurality of positions on the track detected in the second tracking error detection step, and correcting the first displacement detection result at each of the plurality of the positions and the neighborhood thereof, based on the correction data corresponding to the relevant position.

40. A tracking error control method according to claim 34, wherein the third tracking error control step includes the step of calculating the correction data of the first position detection result used for the groove track and the correction data of the first position detection result used for the land track respectively, based on the second displacement detection result.

41. A tracking error control method according to claim 40, wherein the third tracking error control step includes the step of calculating the correction data of the first position detection result based on the second displacement detection result at an arbitrary single position on the track detected in the second tracking error detection step.

42. A tracking error control method according to claim 40, wherein the third tracking error control step includes the step of calculating the correction data of the first position detection result based on the second displacement detection result at a plurality of positions on the track detected in the second tracking error detection step.

43. A tracking error control method according to claim 40, wherein the third tracking error control step includes the step of calculating the correction data of the first position detection result through multiplying the variation in measurement result by the average value of the second displacement detection result at a plurality of positions on the track detected in the second tracking error detection step.

44. A tracking error control method according to claim 40, wherein the third tracking error control step includes the steps of calculating the correction data of the first position detection result corresponding to each of the second displacement detection results at the plurality of positions on the track detected in the second tracking error detection step, and correcting the first displacement detection result at each of the plurality of the positions and the neighborhood thereof, based on the correction data corresponding to the particular position.

45. A tracking error control method according to claim 33, wherein the second tracking error detection step is performed based on comparison between amplitude of the reproduction signal in the first pit string and amplitude of the reproduction signal in the second pit string.

46. A tracking error control method according to claim 45, wherein the second tracking error detection step is performed based on a difference between the amplitude of the reproduction signal for the first pit string and the amplitude of the reproduction signal for the second pit string.

47. A tracking error control method according to claim 33, wherein the second tracking error control step includes the steps of generating correction data of the target position in the first tracking error control step based on the second displacement detection result, and adding the generated correction data to the first displacement detection result.

48. A tracking error control method according to claim 33, wherein the third tracking error control step includes the step of adding the correction data of the first position detection result to the first displacement detection result.

49. An optical disk apparatus for irradiating a light beam on an optical disk, and detecting information stored in the optical disk as a reproduction signal, the optical disk having a track along a circumferential direction, a first pit string disposed on a surface of the optical disk so as to be displaced in a first side along a radial direction from a center of the track, and a second pit string disposed on the surface of the disk so as to be displaced in a second side along the radial direction opposite to the first side, wherein:
  a first positional error of the light beam with respect to the track is detected by the push-pull method while irradiating the light beam in order to output a first displacement detection result;
  a target position of the light beam is set on the track based on the first displacement detection result and the light beam is corrected so as to follow the target position;
  a second positional error of the light beam with respect to the track is detected based on comparison between the reproduction signal of the first pit string and the reproduction signal of the second pit string, thereby to output a second displacement detection result;
  the target position is corrected based on the second displacement detection result; and
  correction data of the first displacement detection result is calculated based on a correction amount of the target position corrected based on the second displacement detection result, and the first displacement detection result is corrected based on the calculated correction data.

* * * * *